(12) United States Patent
Nishioka

(10) Patent No.: US 7,398,403 B2
(45) Date of Patent: Jul. 8, 2008

(54) MULTIPROCESSOR CONTROL APPARATUS, CONTROL METHOD THEREOF, AND INTEGRATED CIRCUIT

(75) Inventor: Shinichiro Nishioka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 603 days.

(21) Appl. No.: 11/169,026

(22) Filed: Jun. 27, 2005

(65) Prior Publication Data

US 2006/0005056 A1    Jan. 5, 2006

(30) Foreign Application Priority Data

Jul. 1, 2004    (JP)    ............................... 2004-195187

(51) Int. Cl.
*G06F 1/00*    (2006.01)
*G06F 1/26*    (2006.01)
*G06F 1/32*    (2006.01)

(52) U.S. Cl. ...................... 713/300; 713/310; 713/320; 713/321; 713/322; 713/323; 713/324; 713/330; 713/340

(58) Field of Classification Search ................. 713/300, 713/310, 320–324, 330, 340
See application file for complete search history.

(56) References Cited

U.S. PATENT DOCUMENTS

| | | | | |
|---|---|---|---|---|
| 5,515,539 | A * | 5/1996 | Ohashi et al. | 713/324 |
| 5,933,794 | A * | 8/1999 | Stalzer | 702/123 |
| 6,732,215 | B2 * | 5/2004 | Smith et al. | 710/305 |
| 6,745,335 | B1 * | 6/2004 | Kusano | 713/324 |
| 7,245,919 | B2 * | 7/2007 | Lau et al. | 455/450 |
| 7,325,148 | B2 * | 1/2008 | Inoue et al. | 713/300 |
| 2002/0082714 | A1 * | 6/2002 | Kumamoto et al. | 700/1 |

FOREIGN PATENT DOCUMENTS

JP    07-146846    6/1995

* cited by examiner

*Primary Examiner*—Abdelmoniem Elamin

(57) ABSTRACT

Provided is a multiprocessor control apparatus that restrains impairment of processing speed of entire operations, while pursuing power consumption saving for a multiprocessor. The multiprocessor control apparatus has: an execution control unit operable to control a processor to, when processors other than the processor have ended respective operations performed in parallel, start performing an operation that uses a result of the operations; and a power control unit operable to control power supply to the processor, where when the processor has been under power-supply restriction, the power control unit cancels the power-supply restriction before one of the other processors, which is the last of all the other processors to end a corresponding operation, ends the corresponding operation.

16 Claims, 24 Drawing Sheets

FIG.3

| PE NUMBER | PE 110a | PE 110b | PE 110c | ... | PE 110n |
|---|---|---|---|---|---|
| CLOCK SUPPLY | OFF | OFF | ON | ... | OFF |
| POWER SUPPLY | LOW | LOW | NORMAL | ... | NORMAL |

301
302
303
300

MULTIPROCESSOR CONTROL APPARATUS, CONTROL METHOD THEREOF, AND INTEGRATED CIRCUIT

BACKGROUND OF THE INVENTION (1) Field of the Invention

The present invention relates to a control apparatus for a multiprocessor. The present invention particularly relates to a technology for reducing power consumption by the control apparatus.

(2) Related Art

In distributed processing, a multiprocessor occasionally has to perform synchronization to pass data among processors therein, or to maintain consistency among processing orders and among values generated by operations. Here, synchronization indicates that a processor, having finished its own processing, waits till other processors end their processing. When all the processors, among which consistency of operation values should be maintained, end their operations, every processor in wait state can go on to a subsequent operation respectively.

In such a multiprocessor system, power saving is attempted by stopping power supply to a processor brought to a wait state, and resuming the power supply when all the processors have ended their operations (e.g. Japanese Laid-open Patent Application No. H7-146846).

However, such power saving in a multiprocessor system has the following problem. When power supply resumes for a processor having been in wait state, it requires a certain amount of time before the power supply voltage stabilizes. This means that a subsequent operation cannot be started immediately, impairing processing speed for the entire operations.

Furthermore, in stopping power supply, each processor has to save the context stored so far in its register (e.g. operation result or processing status) to a memory and so on, in fear of losing the context. Accordingly, after the synchronization and the resumption of power supply, a processor has to read the saved context for having its register reflect the context, which also takes some time. In addition, since such context restoration is performed after the power supply voltage has stabilized, the processing speed for the entire operations will be further impaired.

SUMMARY OF THE INVENTION

The present invention, having been conceived in view of the above problems, has an object of restraining impairment of processing speed of entire operations, while pursuing power consumption saving in the aforementioned multiprocessor.

So as to achieve the stated object, the present invention provides a multiprocessor control apparatus including: an execution control unit operable to control a processor to, when processors other than the processor have ended respective operations performed in parallel, start performing an operation that uses a result of the operations; and a power control unit operable to control power supply to the processor, where when the processor has been under power-supply restriction, the power control unit cancels the power-supply restriction before one of the other processors, which is the last of all the other processors to end a corresponding operation, ends the corresponding operation.

Here, the restriction means any one of reducing power voltage to be supplied, stopping the power supply, and stopping clock supply.

According to the stated structure, the multiprocessor control apparatus relating to the present invention can resume power supply or context restoration before the last processor of all the processors to end its operation ends its operation. By doing so, time required for stabilization of power supply voltage and of context restoration will be concealed apparently. Since this enables faster power stabilization, it becomes possible to move onto a subsequent operation right from the time when the last processor ends its operation, which eliminates waste of time.

Here, a structure is also possible in which the multiprocessor control apparatus further includes the processor and the other processors, where each of the other processors includes a synchronization request signal outputting unit operable to output a synchronization request signal that indicates ending of a corresponding operation, the execution control unit includes a cancellation-signal outputting unit operable to output a cancellation signal for canceling the power-supply restriction when a number of outputted synchronization request signals has reached a predetermined number that is smaller than a number of the other processors, and the power control unit cancels the power-supply restriction upon reception of the cancellation signal.

According to the stated structure, a signal is outputted from each processor, the signal indicating that the processor has reached a synchronization timing. When the number of outputted signals has reached a predetermined number, power restriction is cancelled. Therefore, the processor is able to start executing a subsequent operation right from the time when the last processor ends its operation, which leads to elimination of time loss for the entire operations.

Here, a structure is also possible in which the cancellation-signal outputting unit a) includes a counter for counting a number of synchronization request signals outputted after the other processors have started the respective operations, and b) outputs the cancellation signal when a number counted by the counter has become one short of the number of the other processors.

According to the stated structure, when it comes to a point where there is only one processor left that has not yet finished its operation in all the processors, the power-supply restriction is cancelled. This structure prevents reduction of power saving effect due to cancellation of power-supply restriction too early. For example, assume that power supply is resumed when four of a plurality of processors have not yet finished their operations, and that one among the four processors is extremely low in pursuing its operation. In such a case, the power-supply restriction will be cancelled before the processor has any task to do, which is a waste of power. The structure prevents such a waste.

Here, a structure is also possible in which the execution control unit includes a processor information outputting unit, where when any of the other processors, except for the last or one before the last processor of all the other processors to end an operation, outputs a synchronization request signal, the processor information outputting unit outputs processor information on the any of the other processors that has outputted the synchronization request signal, and the power control unit, upon reception of the processor information, restricts the power supply to the any of the other processors that is indicated by the processor information, and cancels the power-supply restriction to the any of the other processors at the time of canceling the power-supply control to the processor.

A structure is also possible in which each of the other processors further includes a synchronization request signal outputting unit operable to output a synchronization request signal that indicates ending of a corresponding operation, the execution control unit includes a processor information outputting unit, where when any of the other processors, except for the last of all the other processors to end an operation, outputs a synchronization request signal, the processor information outputting unit outputs processor information on the any of the other processors that has outputted the synchronization request signal, and the power control unit, upon reception of the processor information, restricts the power supply to the any of the other processors that is indicated by the processor information, and cancels the power-supply restriction to the any of the other processors at the time of canceling the power-supply control to the processor.

According to the stated structures, the multiprocessor control apparatus is able to restrict power supply to the processors having ended their operations, without fail. This leads to further power saving for the whole of the multiprocessor control apparatus.

In addition, a structure is also possible in which the power control unit a) includes: a low-power supply unit operable to supply power lower than normal power to the processor and the other processors; and a normal-power supply unit operable to supply normal power, and b) restricts power supply to the processor by means of the low-power supply unit, and c) cancels the power-supply restriction by means of the normal-power supply unit.

According to the stated structure, a power saving effect will be produced by supply of low power.

Here, a structure is also possible in which the power control unit stops supplying power to the processor, and each of the other processors includes: a saving unit operable to save information about a register included in a corresponding processor, to a memory after the corresponding processor has outputted a synchronization request signal and before the corresponding processor is brought to the power-supply stop; and a restoring unit operable to read the saved information from the memory for restoration.

According to the stated structure, a power saving effect will be produced by completely stopping power. In addition, according to the stated structures, consistency in the entire operations will be maintained because the context, which otherwise will be lost by stop of power supply, is saved from a corresponding processor, and is restored when the power supply is resumed.

Here, a structure is also possible in which the multiprocessor control apparatus further includes the processor and the other processors, where each of the other processors includes a quasi-synchronization request signal outputting unit operable to output a quasi-synchronization request signal indicating that a corresponding processor has reached a point where there is a predetermined number of instructions left before ending of the corresponding operation, the execution control unit includes a cancellation-signal outputting unit operable to output a cancellation signal for canceling the power-supply restriction when all the other processors have outputted quasi-synchronization request signals respectively, and the power control unit cancels the power-supply restriction upon reception of the cancellation signal.

Here, the predetermined number of instructions corresponds to a summation of: a time required for the power stabilization for the processor; and a time required for context restoration for the processor if any.

By such an arrangement, each of the other processors is operable to output a quasi-synchronization request signal a little before ending of its operation, and the timing for power restoration can be defined based on the quasi-synchronization request signal. Therefore, the processor can perform its operation with power connection during a minimum required time.

Here, a structure is also possible in which each of the other processors a) includes: an address information outputting unit operable to output address information about an address of an instruction currently executed by a corresponding processor; and an address storage unit operable to store a predefined address, and b) outputs the quasi-synchronization request signal when the address information outputted by the address information outputting unit accords with the address stored in the address storage unit.

According to the stated structure, a quasi-synchronization request signal can be outputted at the right timing when the address of an instruction currently executed in a program within a processor accords with a predefined address.

Here, a structure is also possible in which the quasi-synchronization request signal is outputted at the time when a special instruction for outputting a quasi-synchronization request signal is interpreted, the special instruction being described in a program that each of the other processors executes.

According to the stated structure, an instruction for outputting a quasi-synchronization request signal is incorporated into a program in advance. Therefore the quasi-synchronization request signal is outputted without any circuit for checking the address accordance.

Here, a structure is also possible in which the multiprocessor control apparatus further includes the processor and the other processors, where the processor, using the result of the respective operations performed in parallel by the other processors and a result of a first operation executed in the processor, performs a second operation, the processor includes a first synchronization request signal outputting unit operable to output a synchronization request signal that indicates ending of the first operation when the first operation ends, each of the other processors includes a second synchronization request signal outputting unit operable to output a synchronization request signal that indicates ending of the respective operations when a corresponding one of the respective operations ends, and the power control unit restricts power supply to a processor having outputted a synchronization request signal when not all processors, including the processor and the other processors, have ended respective operations yet.

According to the stated structure, the processor also share a corresponding portion of the distributed processing, together with the other processors. In addition, the ending time of the first operation can be set as the timing of starting power-restriction to the processor.

In addition, a structure is also possible in which the power control unit a) includes a clock supply unit operable to supply clocks to each of the processor and the other processors, and b) restricts clock supply to a processor having outputted a synchronization request signal when not all processors, including the processor and the other processors, have ended respective operations yet.

According to the stated structure, the processors can be cut off from clock supply. A processor cannot start operating if without clock supply. Therefore stopping of clock supply can save power.

In addition, the present invention provides a multiprocessor control method used in a multiprocessor control apparatus for controlling a processor to, when processors other than the processor have ended respective operations performed in parallel, start performing an operation that uses a result of the operations, the multiprocessor control method including: a power restriction step of restricting power supply to the processor; a cancellation step of canceling the power-supply restriction before one of the other processors, which is the last of all the other processors to end a corresponding operation, ends the corresponding operation; and an execution control step of controlling the processor to, when the other processors have ended the respective operations performed in parallel, start performing the operation that uses the result of the operations.

According to the stated method, the multiprocessor control apparatus can perform power control to the processor.

In addition, the present invention provides an integrated circuit for controlling a multiprocessor, the integrated circuit including: an execution control unit operable to control a processor to, when processors other than the processor have ended respective operations performed in parallel, start performing an operation that uses a result of the operations; and a power control unit operable to control power supply to the processor, where when the processor has been under power-supply restriction, the power control unit cancels the power-supply restriction before one of the other processors, which is the last of all the other processors to end a corresponding operation, ends the corresponding operation.

According to the stated structure, the integrated circuit to be loaded onto the multiprocessor control apparatus is able to perform power control to the processor.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 3 is a truth table showing one example of the power supply state of each PE (processor element), which is retained by a power control unit;

FIG. 23 is a block diagram showing an example of a functional structure of a synchronization prediction judgment unit, a synchronization establishment judgment unit, and so on.

DESCRIPTION OF THE PREFERRED EMBODIMENTS

Figure 1:
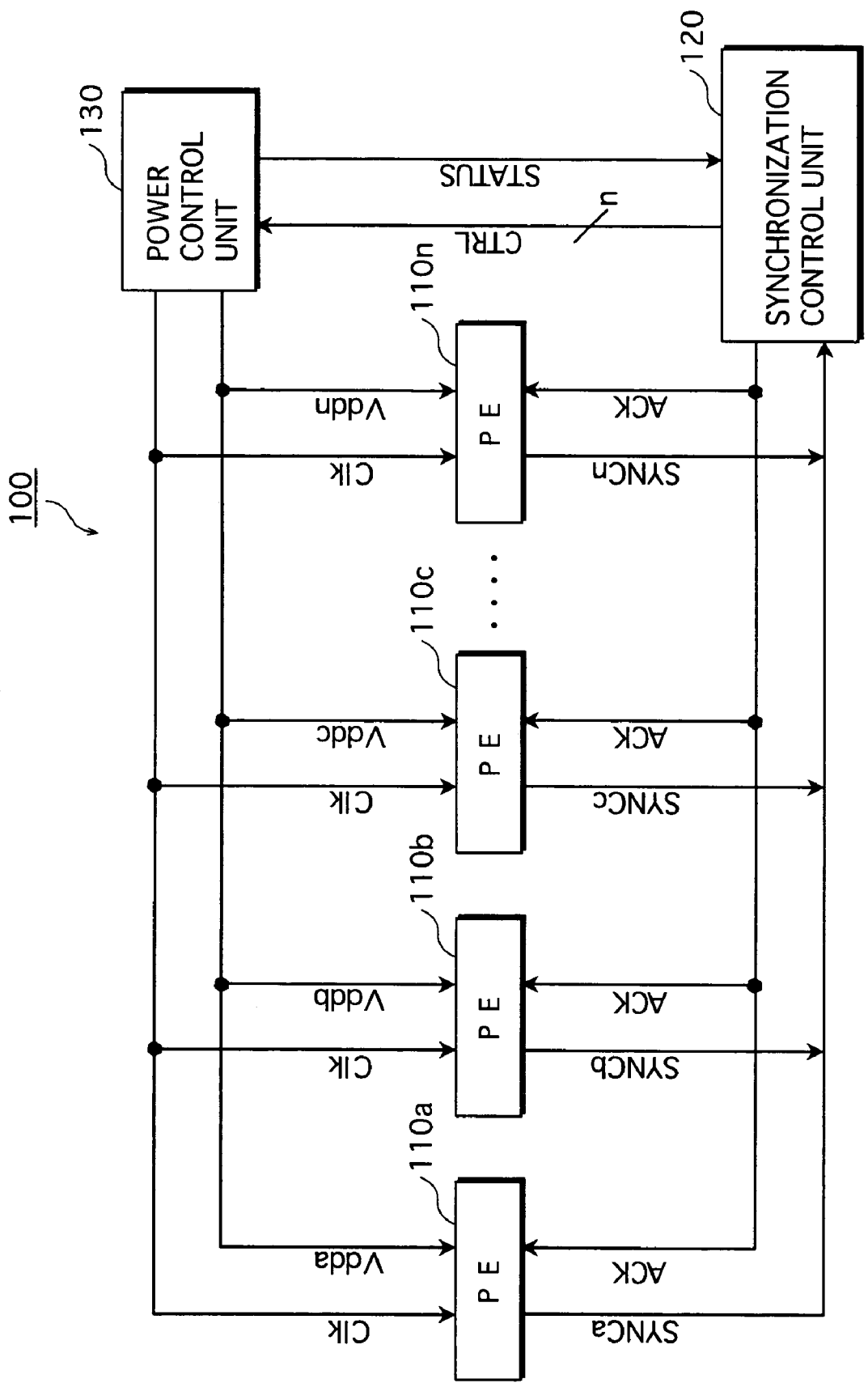
FIG. 1 is a block diagram showing a functional structure of a multiprocessor system relating to the first embodiment.

The following describes an embodiment of a multiprocessor control apparatus relating to the present invention, by referring to the drawings.

First Embodiment

<Structure>

FIG. 1 is a block diagram showing a functional structure of a multiprocessor control apparatus relating to the first embodiment.

As shown in FIG. 1, the multiprocessor control apparatus 100 includes a PE 110a, a PE 110b, a PE 110c, . . . , a PE 110n, a synchronization control unit 120, and a power control unit 130.

Each of the PEs performs operations assigned to itself. Each PE outputs a synchronization request signal SYNC when, on a program, it comes to a point where further processing is impossible unless the other PEs finish their operations. The PE then waits till receiving a synchronization-wait cancellation signal ACK. Hereinafter in this specification, such a point is referred to as "synchronization point".

Figure 2:
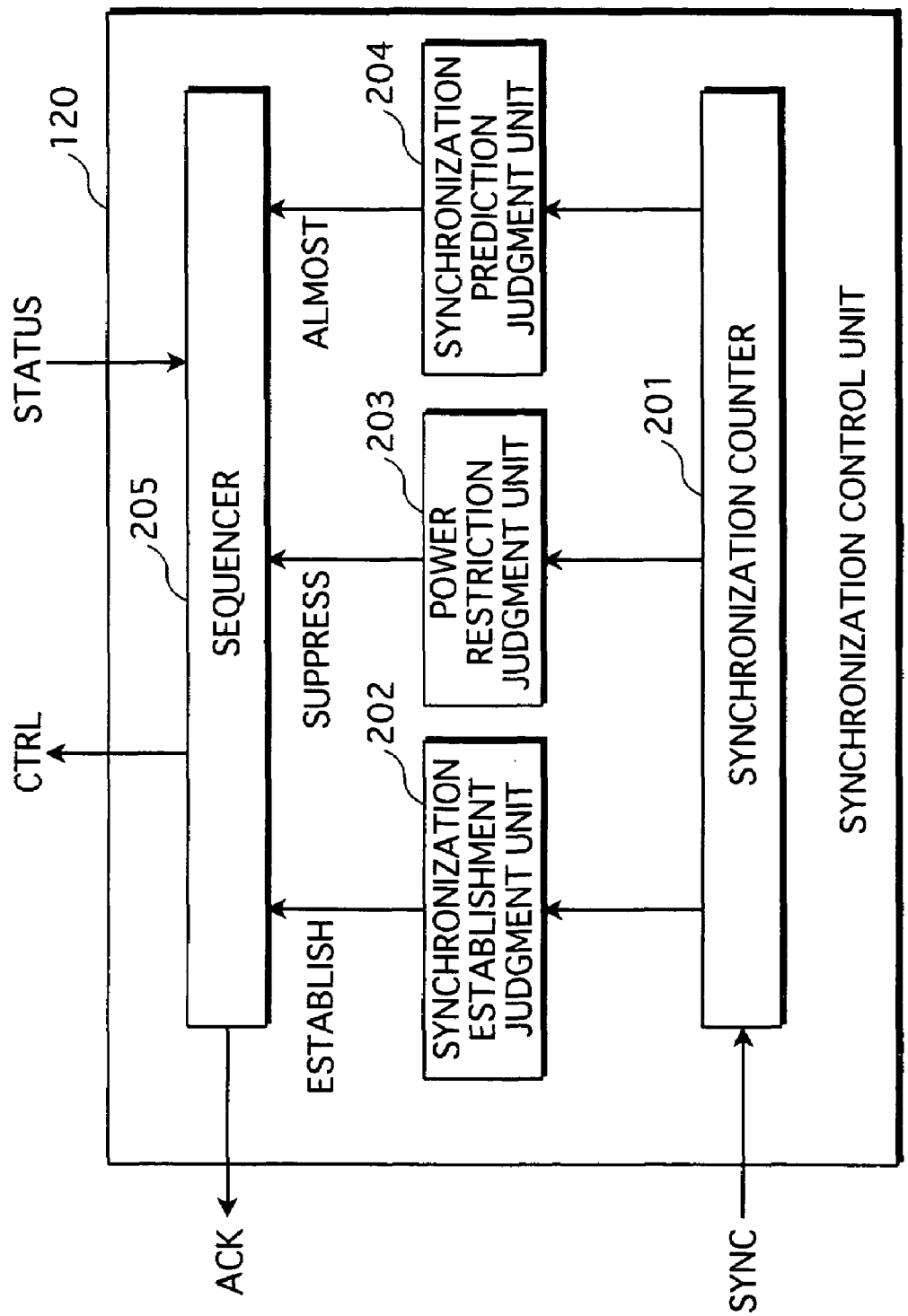
FIG. 2 is a block diagram showing a functional structure of a synchronization control unit relating to the first embodiment.

As shown in FIG. 2, the synchronization control unit 120 includes a synchronization counter 201, a synchronization establishment judgment unit 202, a power restriction judgment unit 203, a synchronization prediction judgment unit 204, and a sequencer 205.

The synchronization counter 201 receives a synchronization request signal SYNC from each PE, and decreases the number of synchronization set as a default to the memory included in itself. The counter is decreased by 1 each time a synchronization request signal is received from a PE. As a default, the synchronization counter 201 is set as the same number as the number of the PEs. Every time the synchronization counter 201 reaches 0, it is reset and updated to the number of PEs involved in the next round of synchronization. The synchronization counter 201 also has a function of outputting information indicating which PE has outputted a received synchronization request signal, to the power restriction judgment unit 203.

The synchronization establishment judgment unit 202 continuously monitors the number at the synchronization counter 201. When the number reaches 0, the synchronization establishment judgment unit 202 outputs a synchronization establishment signal ESTABLISH to the sequencer 205.

The power restriction judgment unit 203 continuously monitors the number at the synchronization counter 201. When the number indicates 2 or more, the power restriction judgment unit 203, based on information on PE received from the synchronization counter 201, outputs a signal SUPPRESS requesting the PE's power restriction to the sequencer 205.

The synchronization prediction judgment unit 204 continuously monitors the number at the synchronization counter 201. When the number becomes 1, the synchronization prediction judgment unit 204 outputs a synchronization prediction signal ALMOST to the sequencer 205.

The sequencer 205 outputs a synchronization-wait canceling signal ACK to each PE, and outputs a control signal CTRL so as to control the power control unit 130. The synchronization-wait canceling signal ACK is output when a synchronization establishment signal ESTABLISH is received from the synchronization establishment judgment unit 202. The sequencer 205 also outputs a signal CTRL to the power control unit 130 for power consumption reduction, upon reception of SUPPRESS from the power restriction judgment unit 203. When receiving ALMOST from the synchronization prediction judgment unit 204, the sequencer 205 outputs a signal CTRL to each PE being under power restriction, for canceling the power restriction.

The power control unit 130 includes a step-down transformer for performing step-down of a power supply voltage, and a step-up transformer for bringing the stepped-down voltage back to the initial voltage. The power control unit 130 switches between a low power consumption and a normal power consumption, with respect to each PE. There are two low power consumption modes. The low power consumption mode 1 is to stop the clock supply, as well as to lower the power supply voltage down to the extent that the information (e.g. operation result) in the register will not be lost. The low power consumption mode 2 is to only stop the clock supply, keeping the power supply voltage in the normal state. The power control unit 130 also supplies process clocks to each PE. In addition, the power control unit 130 outputs a state signal STATUS indicating which PE is currently under power restriction, upon request from the synchronization control unit 120.

<Data>

The following describes data treated by the multiprocessor control apparatus 100.

First, how the power control unit 130 manages power restriction state of PEs is described using a power restriction table 300 of FIG. 3. The power restriction table 300 shows provision/non-provision of clock supply 302, and a power supply state 303, in association with the PE number 301.

The provision/non-provision of clock supply 302 literally indicates whether clock supply to a corresponding PE is under way. The power supply state 303 indicates whether each PE is provided with a normal power or a low power. Here, so as to facilitate understanding, the provision/non-provision of clock supply 302 is shown by either "ON" and "OFF", and the power supply state 303 is shown by either "normal" and "low". Realistically, however, they are managed by data of "1" and "0" in corresponding registers.

Figure 4:
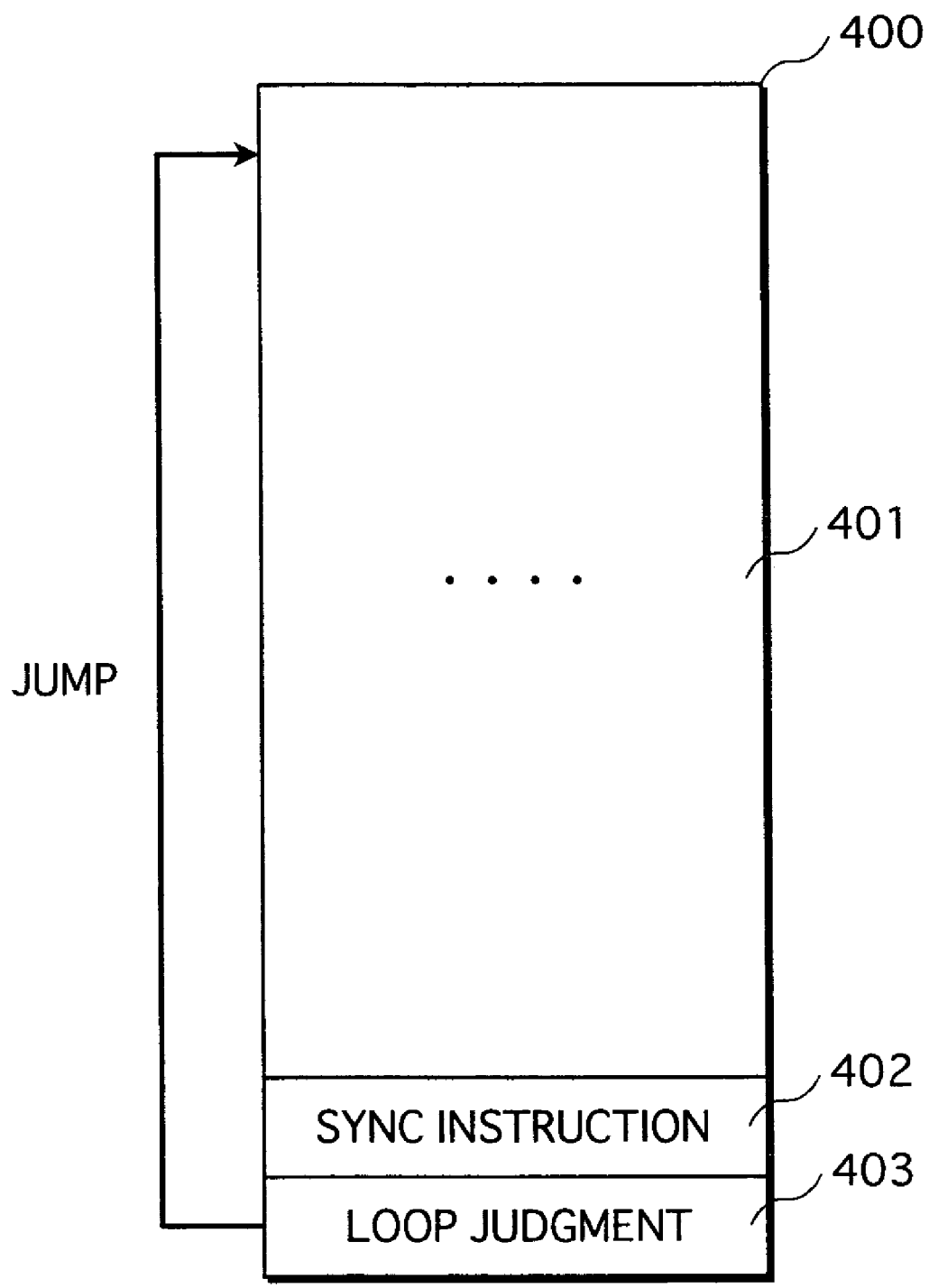
FIG. 4 is a diagram showing one example of a structure of a program executed by a PE.

Next, one example of a program executed by each PE is described with reference to FIG. 4. FIG. 4 shows a program example 400 that a PE deals with. The program example 400 contains process substance 401 (not detailed in the drawing), a SYNC instruction 402 that issues a synchronization request signal SYNC when it comes to a synchronization point after completion of all the processing, and loop judgment 403. Here, the loop judgment 403 is not always necessary, but is described because, usually in a multiprocessor system, one PE performs a loop operation. In the program example 400, processing is performed from higher rank instructions. When reaching the synchronization point, the PE outputs the SYNC instruction 402 to the synchronization control unit 120. Then the PE goes into wait state. The PE starts performing subsequent processing from the loop judgment 403, upon reception of a synchronization-wait cancellation signal ACK.

<Operation>

The following details the operations performed by the multiprocessor control apparatus 100 relating to the first embodiment.

Figure 5:
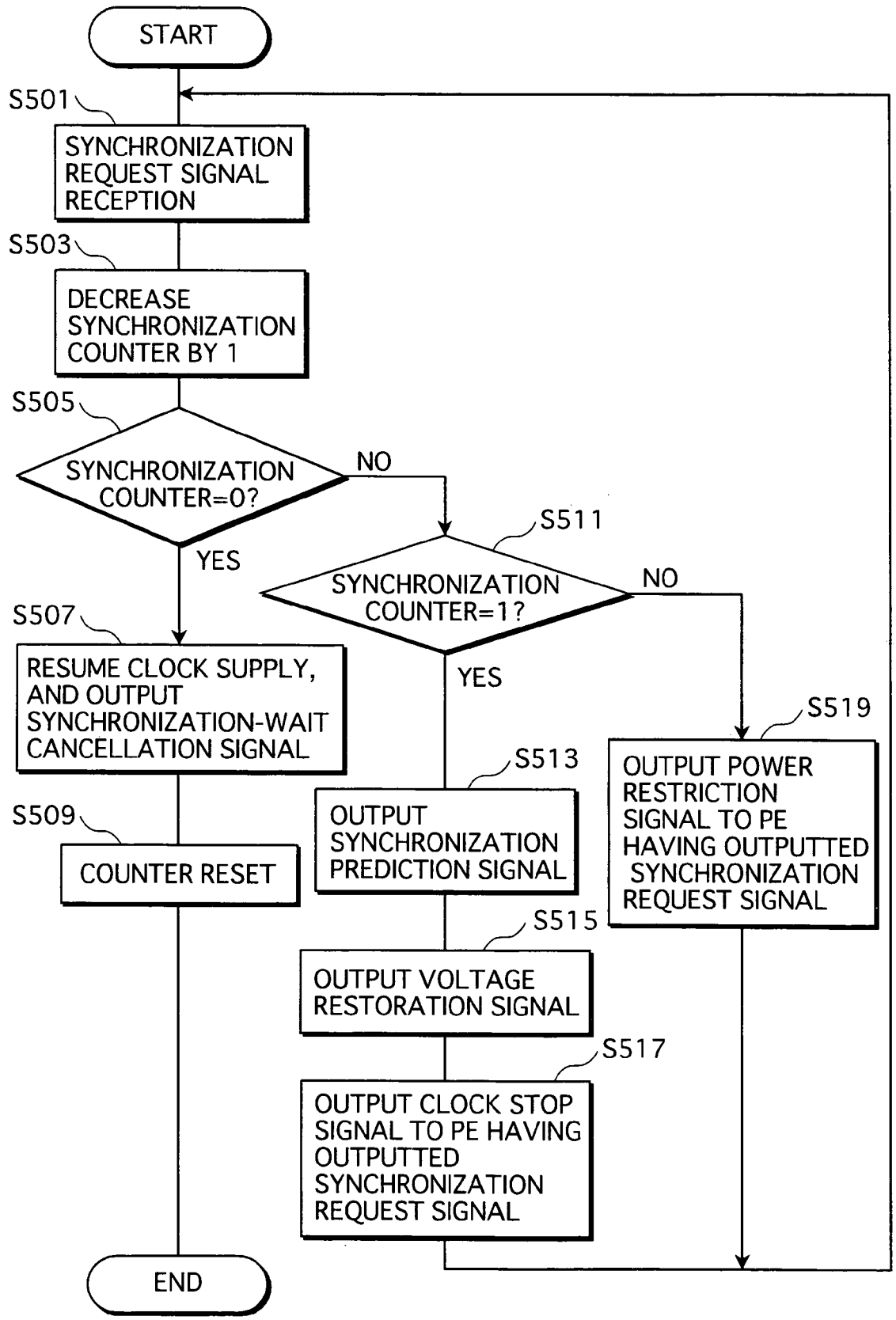
FIG. 5 is a flowchart showing an operation performed by the multiprocessor control apparatus relating to the first embodiment.

First, the operations performed by the multiprocessor control apparatus 100 relating to the first embodiment are described, with use of the flowchart of FIG. 5. The operations of the multiprocessor control apparatus 100 basically correspond to the operations of the synchronization control unit 120. Therefore, in the following, the operations of the synchronization control unit 120 are described as the operations of the multiprocessor control apparatus 100. Here, the description focuses on operations till all the PEs reach the synchronization point thereby canceling synchronization wait.

Each PE in the multiprocessor control apparatus 100 executes processing given to itself. Upon completion of its processing, a PE outputs a synchronization request signal SYNC, which indicates that the PE has finished its processing and is in wait state for synchronization, to the synchronization control unit 120.

The synchronization control unit 120 receives the outputted synchronization request signal SYNC (Step S501), and decreases the synchronization counter 201 by 1, which is in the synchronization control unit 120 (Step S503). The synchronization establishment judgment unit 202 judges whether the number shown by the synchronization counter 201 is 0 or not (Step S505). When the judgment has result in the affirmative (Step S505: YES), the synchronization establishment judgment unit 202 issues a synchronization establishment signal ESTABLISH, and based thereupon, the sequencer 205 outputs a control signal CTRL to the power control unit 130, for supplying a clock to each PE, and outputs a synchronization-wait cancellation signal ACK to each PE (Step S507). The processing ends by resetting the counts at the synchronization counter 201, and then bringing it back to the number of the PEs (Step S509).

When the synchronization counter 201 does not indicate 0 in Step S505 (Step S505: NO), the synchronization prediction judgment unit 204 judges whether the synchronization counter 201 indicates 1 or not (Step S511). When the judgment results in the affirmative (Step S511: YES), the synchronization prediction judgment unit 204 issues a synchronization prediction signal ALMOST (Step S513). The sequencer 205 receives the synchronization prediction signal ALMOST, obtains the state signal STATUS that is information on the state of PEs under power restriction at the point of time, from the power control unit 130, and outputs a control signal CTRL for canceling of the power restriction to the PEs (Step S515). Then, the sequencer 205 outputs, to the power control unit 130, a clock stop signal CTRL for stopping the clock supply with respect to the PE having outputted the synchronization request signal SYNC (Step S517). Then, the control returns to Step S501 for subsequent processing.

When the synchronization counter 201 does not indicate 1 in Step S511 (Step S511: NO), the power restriction judgment unit 203, based on the received information on PE, issues a power restriction signal SUPPRESS for requesting restriction of power directed to the PE (Step S519). Then the sequencer 205 outputs, to the power control unit 130, a CTRL signal for restricting power directed to the PE. Then the power control unit 130 steps down the power directed to the specified PE according to the received CTRL signal, as well as stopping the clock supply with respect to the PE. Then the control returns to Step S501 for subsequent processing.

As follows, the operation of the multiprocessor control apparatus 100 is described by way of an example.

Figure 6:
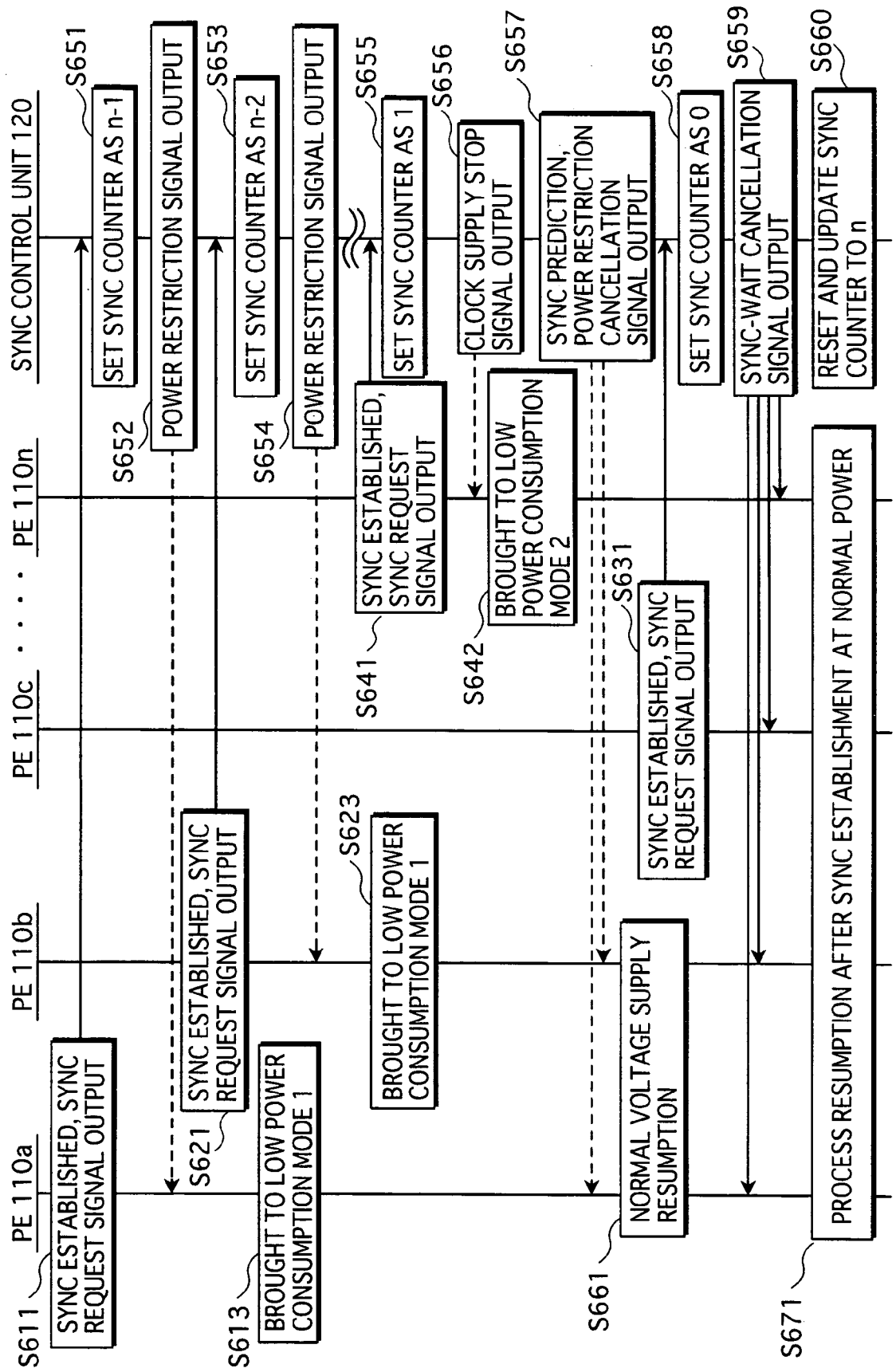
FIG. 6 is a timing chart showing an operational example of each PE and the synchronization control unit, which are included in the multiprocessor control apparatus relating to the first embodiment.

FIG. 6 is a timing chart showing the operational example. In this timing chart, the PE 110a is the PE which finishes its processing first, and the PE 110b finishes its processing immediately following the PE 110a. The PE 110n is the PE which finishes its processing second to the last, and the PE 110c finishes its processing the last of all the PEs.

The PE 110a first reaches a synchronization point of the program, and outputs a synchronization request signal SYNCa (Step S611). The synchronization control unit 120, receiving the synchronization request signal SYNCa, subtracts n set at the synchronization counter 201, by 1 to yield n−1 (Step S651). The synchronization control unit 120 outputs, to the power control unit 130, a control signal CTRL for restricting power directed to the PE 110a having output the synchronization request signal SYNCa (Step S652). According to the instruction from the synchronization control unit 120, the power supplied from the power control unit 130 to the PE 110a is reduced to low, and the clock supply to the PE 110a is stop (Step S613).

Next, the PE 110b reaches a synchronization point, and outputs a synchronization request signal SYNCb to the synchronization control unit 120 (Step S621). The synchronization control unit 120, receiving the synchronization control signal SYNCb, subtracts n−1 of the synchronization counter 201 by 1 to yield n−2 (Step S653). The synchronization control unit 120 outputs, to the power control unit 130, a control signal for performing power restriction directed to the PE 110b having output the synchronization request signal SYNCb (Step S654). Then, the power supplied from the power control unit 130 to the PE 110b is reduced to low, and the clock supply to the PE 110b is stop (Step S623).

After this, the rest of the PEs, excluding the PE 110c and the PE 110n, respectively output a synchronization request signal SYNC and go into the low power consumption mode 1.

In the meantime, the PE 110n reaches a synchronization point, and outputs a synchronization request signal SYNCn to the synchronization control unit 120 (Step S641). The synchronization control unit 120, receiving the synchronization request signal SYNCn, decreases the synchronization counter 201 by 1, thereby having the synchronization counter 201 to indicate 1 (Step S655). The synchronization control unit 120 outputs, to the power control unit 130, a control signal CTRL for stopping the clock supply with respect to the PE 110n having output the synchronization request signal SYNCn (Step S656). Then, the PE 110n goes into the low power consumption mode 2 in which the PE 110n is cut off from the clock supply of the power control unit 130 (Step S642). In addition, the synchronization prediction judgment unit 204, confirming that the number the synchronization counter 201 has become 1, issues a synchronization preparation signal ALMOST to the sequencer 205. The sequencer 205, based on the state signal STATUS, instructs the power control unit 130 to cancel power restriction of the PEs that have been under power restriction (Step S657).

The PEs, having been under power restriction, start to gain normal power supply again (Step S661), however without provision of clock supply. Note that the power control unit 130 only stops clock supply with respect to the PE 110n having output the synchronization request signal SYNCn, without bringing the PE 110n under low power supply (Step S642).

Then, each PE waits till the PE 110c to reach a synchronization point.

When reaching the synchronization point, the PE 110c outputs a synchronization request signal SYNCc to the synchronization control unit 120 (Step S631). Then, the synchronization control unit 120 decreases the synchronization counter 201 by 1, to yield 0 (Step S658). The synchronization establishment judgment unit 202, confirming that the number at the synchronization counter 201 has become 0, outputs a synchronization establishment signal ESTABLISH to the sequencer 205. The sequencer 205, receiving the synchronization establishment signal ESTABLISH, outputs, to the power control unit 130, a control signal CTRL for restarting the clock supply to each PE, and outputs a synchronization-wait cancellation signal ACK to each PE (Step S659). When each PE receives a synchronization-wait cancellation signal ACK, its wait state is cancelled. Then each PE performs the following operation (Step S671). In addition, the synchronization control unit 120, having output the synchronization-wait cancellation signal, resets the synchronization counter 201 to the number of PEs (i.e. n) (Step S660), and then performs subsequent processing.

Note that in the above description using the timing chart of FIG. 6, where an arrow sign is indicated by a dashed line, it indicates that the corresponding instruction is performed not directly from the synchronization control unit 120, but via the power control unit 130.

Modification Example of the First Embodiment

In the first embodiment, power saving is attempted by reducing the power directed to each PE. However, in the present modification example, the power is completely stopped, instead of being reduced. It is expected to achieve further power saving effect by completely cutting off the power supply.

<Structure>

Figure 7:
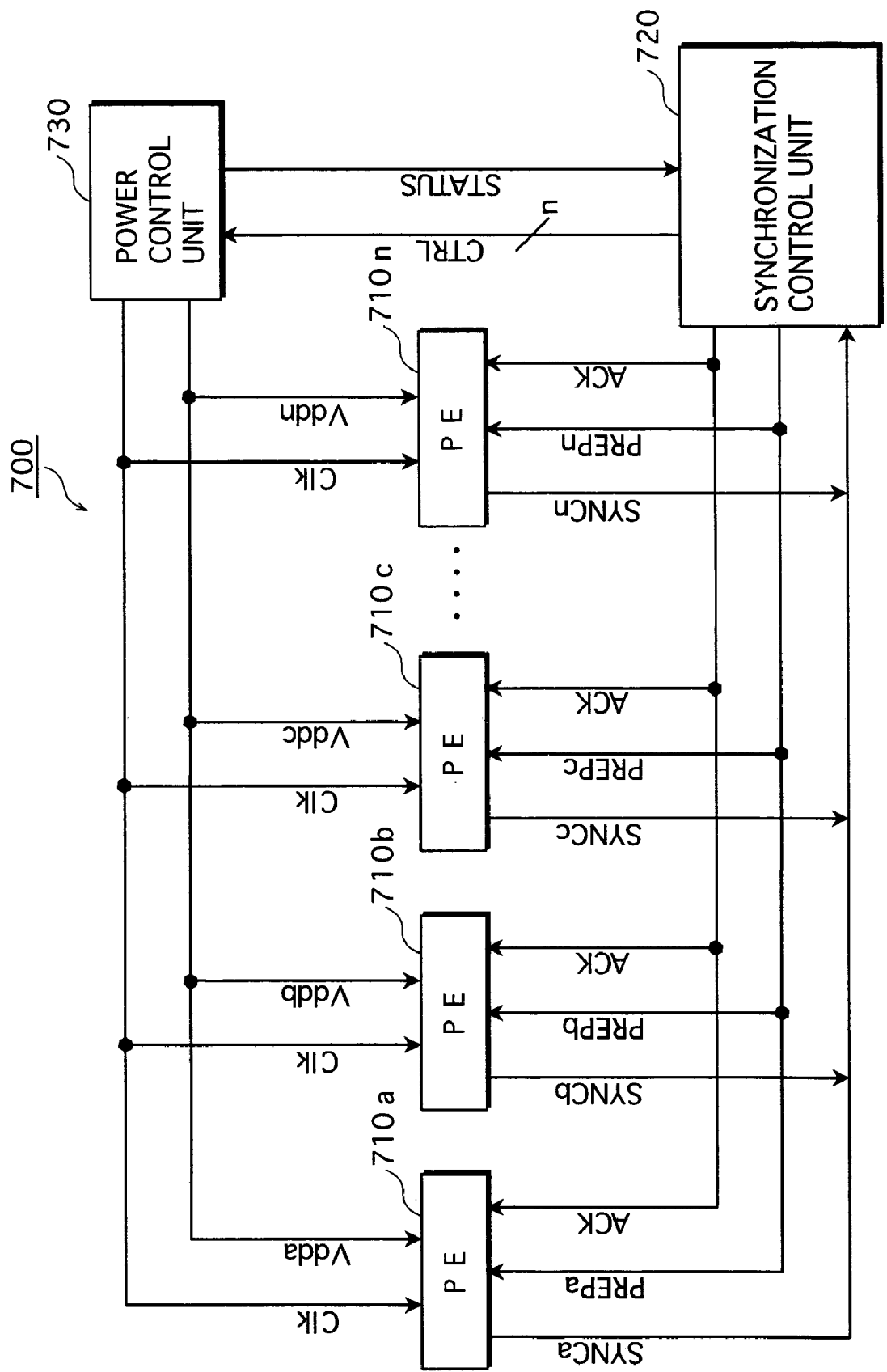
FIG. 7 is a block diagram showing a functional structure of a multiprocessor control apparatus relating to a modification example of the first embodiment.
Figure 8:
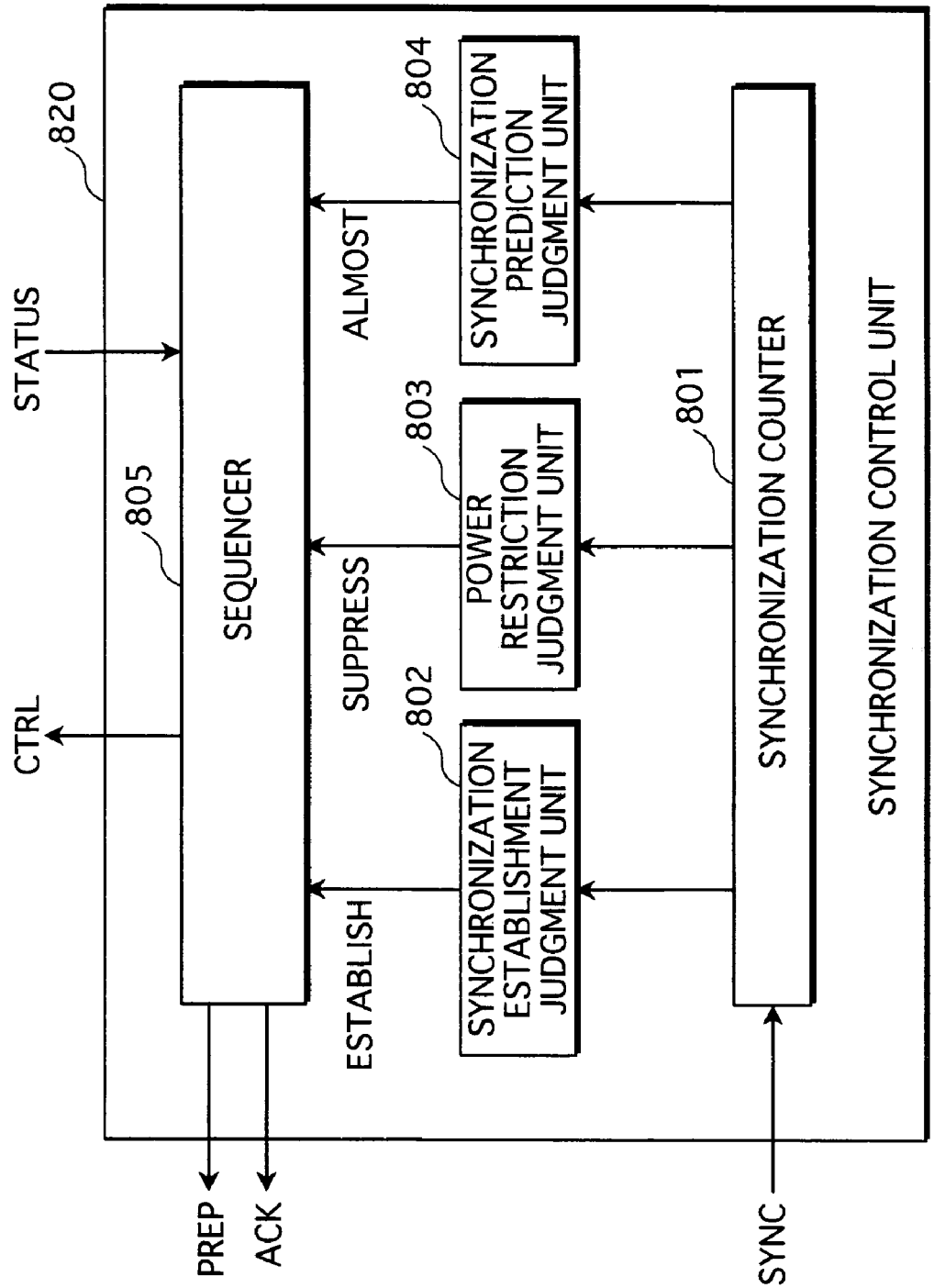
FIG. 8 is a block diagram showing a functional structure of a synchronization control unit relating to the modification example of the first embodiment.

FIG. 7 is a block diagram showing a functional structure of a multiprocessor control apparatus 700 according to the modification example of the first embodiment.

The main functions are the same as those in the first embodiment. Therefore, the following focuses on the differences with the first embodiment.

First, the difference of PEs from the counterparts of the first embodiment is described. In the modification example of the first embodiment, the power is completely stopped in the power saving state. Accordingly, a PE has to save the context (mainly the register value) in fear of losing the context, when there is any other PE still performing operations when the PE has reached a synchronization point. In view of this, each PE has a function to save its context to a separate nonvolatile memory (not shown in the drawing), unless the PE is the last to output a synchronization request signal SYNC or the second to the last. Each PE also has a function to read and reflect the saved context.

In addition, the synchronization control unit 720 performs as follows. When it comes to a state where there are two PEs left that are out of power, the sequencer 805 outputs a control signal CTRL prompting power restoration to the power control unit 730, in response to the issuance of ALMOST from the synchronization prediction judgment unit 803. Then the synchronization control unit 720 outputs a signal PREP for prompting context restoration to every PE under power off, upon receiving a state signal STATUS indicating information on all the PEs that are already under power off.

The power control unit 730, based on the instruction from the synchronization control unit 720, stops supplying power to a PE having outputted a synchronization request signal SYNC, instead of reducing the power supply thereto. The power control unit 730 also restores the power supply to the PEs from which the power supply has been stopped, upon reception of such an instruction from the synchronization control unit 720. It should be noted that once a PE is cut off from power supply, it sometimes takes nearly 1,000 cycles in the unit of process clock before the power supply voltage stabilizes for the PE. Here, the low power consumption mode, in which both of the clock supply and the power supply are stopped, is referred to as "low power consumption mode 3" in this specification.

<Operation>

Figure 9:
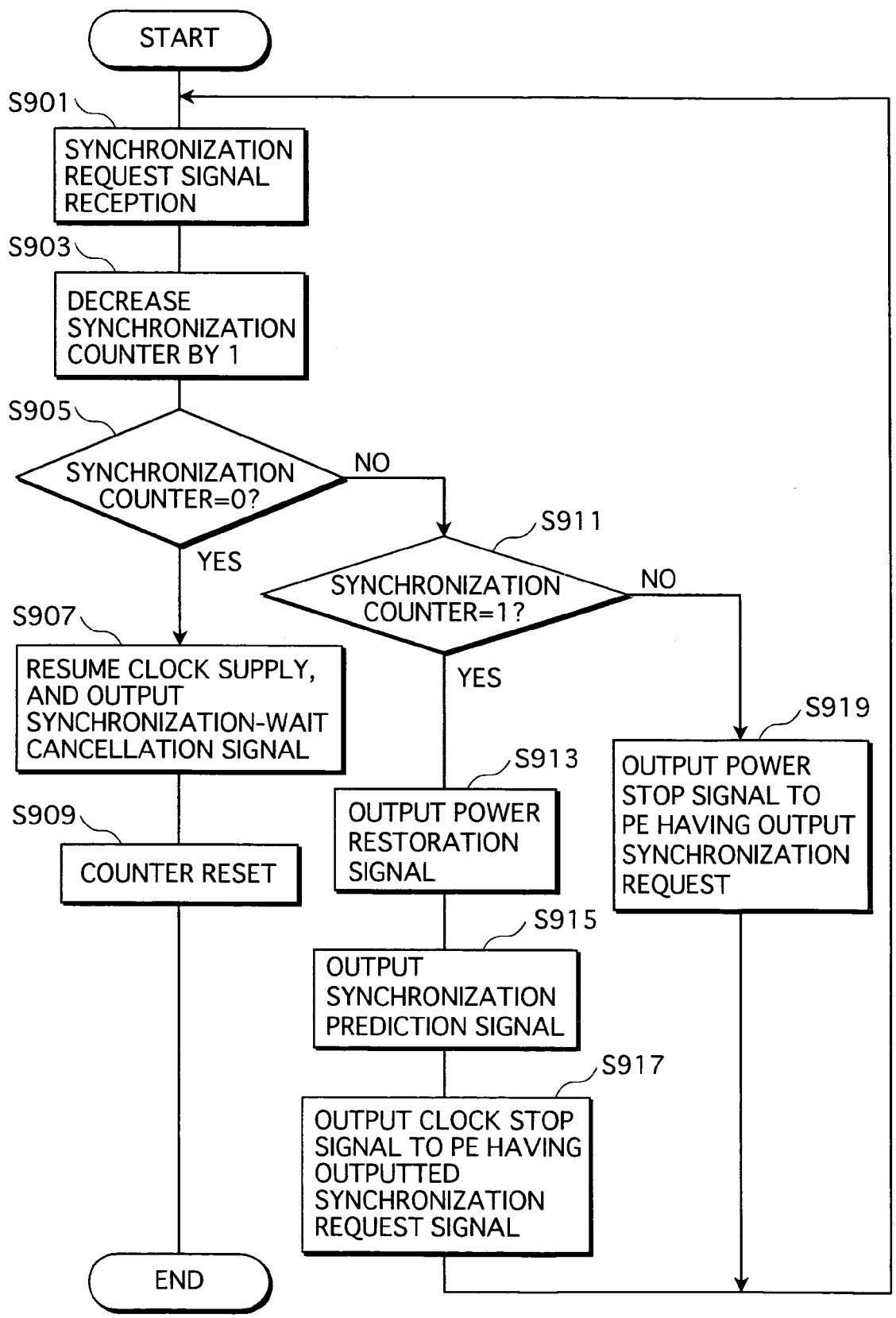
FIG. 9 is a flowchart showing an operation performed by the multiprocessor control apparatus relating to the modification example of the first embodiment.

The operation performed by the multiprocessor control apparatus 700 relating to the modification example of the first embodiment is shown in the flowchart of FIG. 9. Here, the operation performed by the multiprocessor control apparatus 700 is basically the same as the counterpart of the first embodiment. Therefore, only the differences therebetween are detailed as follows.

As shown in FIG. 9, the contents of Step S919 is different from that of Step S519 of the first embodiment. In detail, in the first embodiment, a power restriction signal is outputted so as to provide the power control unit 130 with a control signal CTRL prompting low power supply. However in the present embodiment, a power stop signal is outputted instead. When receiving this power stop signal, the power control unit 730 stops power supply directed to any PE having outputted a synchronization request signal, after their context has been saved.

The other operations are the same as those in the first embodiment.

Figure 10:
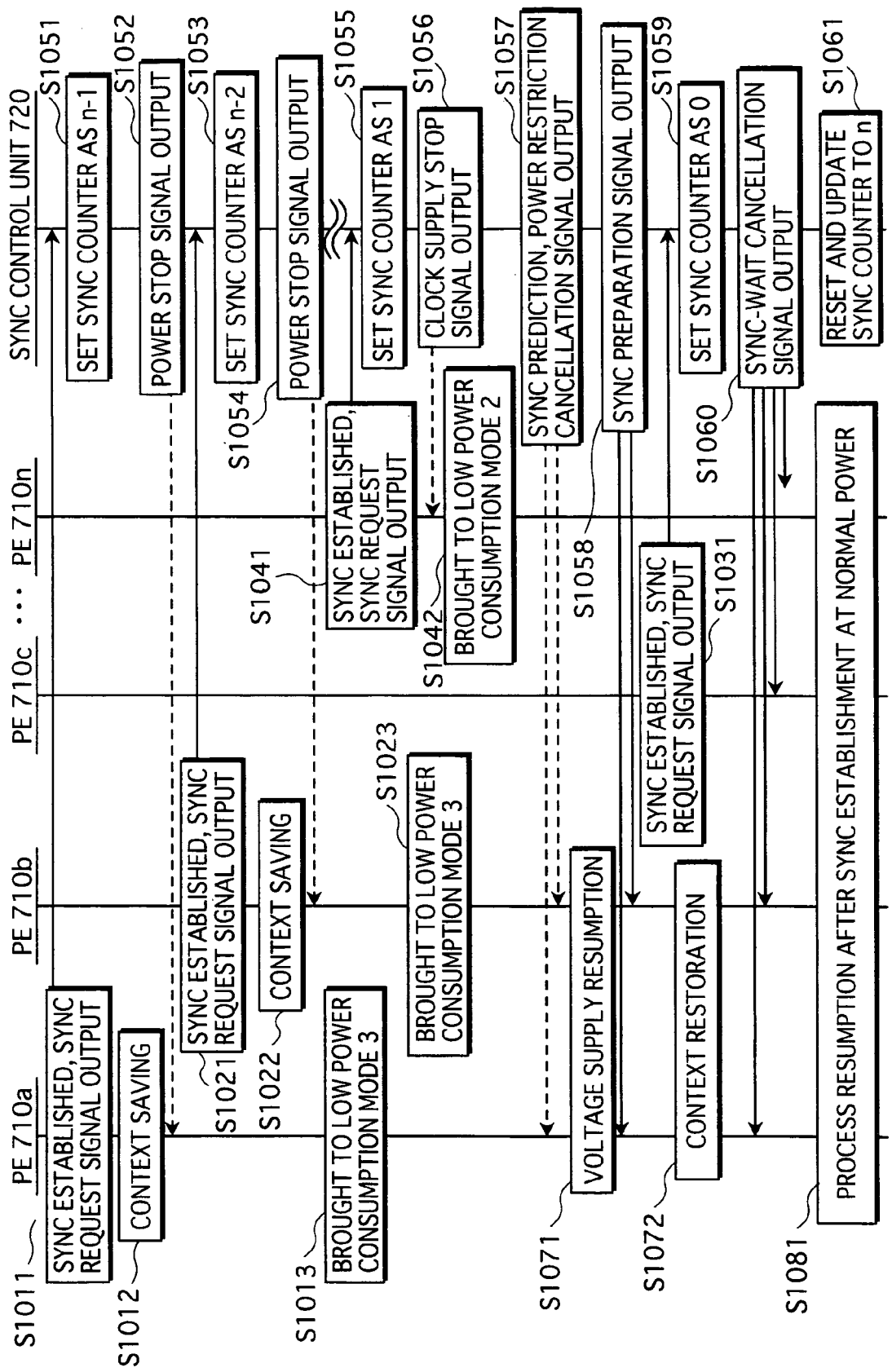
FIG. 10 is a timing chart showing an operational example of each PE and the synchronization control unit, which are included in the multiprocessor control apparatus relating to the modification example of the first embodiment.

FIG. 10 is a timing chart illustrated by modifying FIG. 6 to agree with the present modification example.

As shown in FIG. 10, a PE performs context saving after issuance of a synchronization request signal, unlike in the timing chart of the first embodiment (Steps S1012 and S1022). After this, the PE goes into the low power consumption mode 3 (Steps S1013 and S1023). In addition, after restart of power supply to corresponding PEs (Step S1071) and after the stabilization of the power supply voltage value thereto, the PEs perform context restoration (Step S1072).

Second Embodiment

In both of the first embodiment and its modification example described above, there should be at least three PEs so that the present invention be effective. The second embodiment provides a multiprocessor control apparatus that can play an effect even when the number of PEs is 2.

<Structure>

Figure 11:
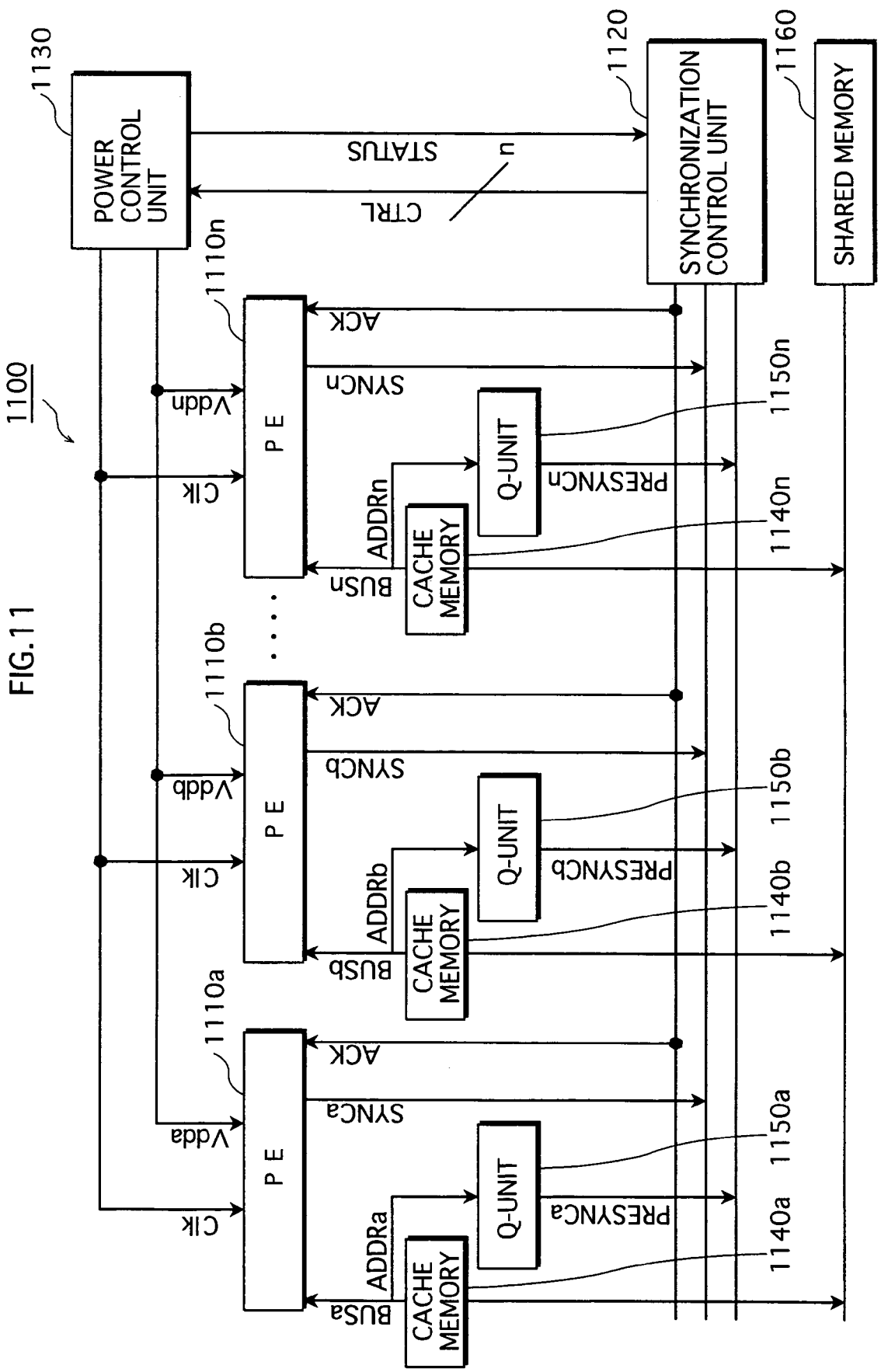
FIG. 11 is a block diagram showing a functional structure of a multiprocessor control apparatus relating to the second embodiment.

FIG. 11 shows a functional structure of a multiprocessor control apparatus 1100 relating to the second embodiment.

As shown in FIG. 11, the multiprocessor control apparatus 1100 includes a PE 1110a, a PE 1110b, ..., a PE 1110n, a synchronization control unit 1120, a power control unit 1130, cache memories 1140a, 1140b, ..., 1140n, quasi-synchronization request signal generating units (abbreviated as "Q-unit" in the drawing) 1150a, 1150b, ..., 1150n, and a shared memory 1160.

The PEs 1100a, 1100b, ..., 1100n respectively output an address signal corresponding to an instruction that the PE is executing, in addition to performing an operation assigned thereto.

Figure 12:
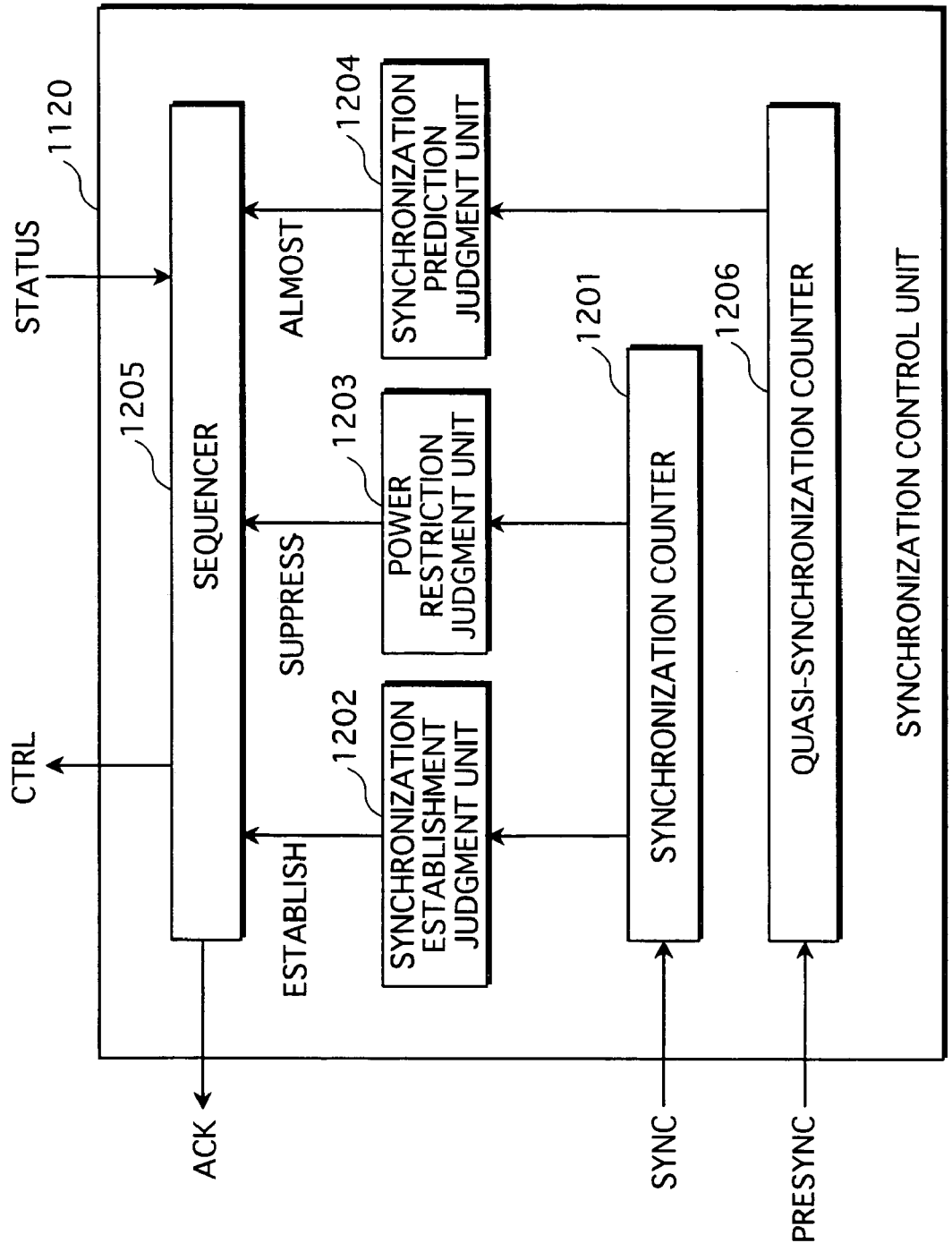
FIG. 12 is a block diagram showing a functional structure of a synchronization control unit relating to the second embodiment.

The main function of the synchronization control unit 1120 is to control the power control unit 130. The functional structure is shown in FIG. 12. As shown in FIG. 12, the synchronization control unit 1120 includes a synchronization counter 1201, a synchronization establishment judgment unit 1202, a power restriction judgment unit 1203, a synchronization prediction judgment unit 1204, a sequencer 1205, and a quasi-synchronization counter 1206.

The synchronization counter 1201 receives a synchronization request signal SYNC from each PE, and decreases the number of synchronization set as a default to the memory included in itself. The counter is decreased by 1 each time a synchronization request signal is received from a PE. As a default, the synchronization counter 1201 is set as the same number as the number of the PEs. Every time the synchronization counter 1201 reaches 0, it is reset and updated to the number of PEs involved in the next round of synchronization. The synchronization counter 1201 also has a function of outputting information indicating which PE has outputted a received synchronization request signal, to the power restriction judgment unit 1203.

The synchronization establishment unit 1202 continuously monitors the number at the synchronization counter 1201. When the number reaches 0, the synchronization establishment judgment unit 1202 outputs a synchronization establishment signal ESTABLISH to the sequencer 1205.

The power restriction judgment unit 1203 continuously monitors the number at the synchronization counter 1201. When the number indicates 2 or more, the power restriction judgment unit 1203, based on information on PE received from the synchronization counter 1201, outputs a signal SUPPRESS requesting the PE's power restriction to the sequencer 1205.

The synchronization prediction judgment unit 1204 continuously monitors the number at the quasi-synchronization counter 1206. When the number becomes 1, the synchronization prediction judgment unit 1204 outputs a synchronization prediction signal ALMOST to the sequencer 1205.

The sequencer 1205 outputs a synchronization-wait canceling signal ACK to each PE, and outputs a control signal CTRL so as to control the power control unit 1130. The synchronization-wait canceling signal ACK is output when a synchronization establishment signal ESTABLISH is received from the synchronization establishment judgment unit 1202. The sequencer 1205 also outputs a signal CTRL to the power control unit 1130 for power consumption reduction, upon reception of SUPPRESS from the power restriction judgment unit 1203. When receiving ALMOST from the synchronization prediction judgment unit 1204, the sequencer 1205 outputs a signal CTRL to each PE being under power restriction, for canceling the power restriction.

The quasi-synchronization counter 1206 subtracts the number stored therein by 1, every time a quasi-synchronization request signal PRESYNC is received from a PE. As a default, the quasi-synchronization counter 1206 is set as the number as the number of the PEs. Every time the quasi-synchronization counter 1206 reaches 0, it is reset and updated to the number of PEs involved in the next round of synchronization.

The power control unit 1130 supplies and stops clock/power with respect to each PE, based on an instruction from the synchronization control unit 1120. In addition, the power control unit 1130 outputs a state signal STATUS indicating which PE is currently under power/clock restriction, upon request from the synchronization control unit 1120.

The cache memories 1140a, 1140b, . . . , 1140n are each a buffer for temporarily storing data resulting from separately executed operations, and have a function to prevent data competition and to facilitate writing the data to a shared memory 1160. Each cache memory is accessible from a PE. This is useful because a PE can directly access a cache memory instead of the shared memory 1160, if the cache memory stores therein data of another PE that is necessary for the PE's operation.

Figure 13:
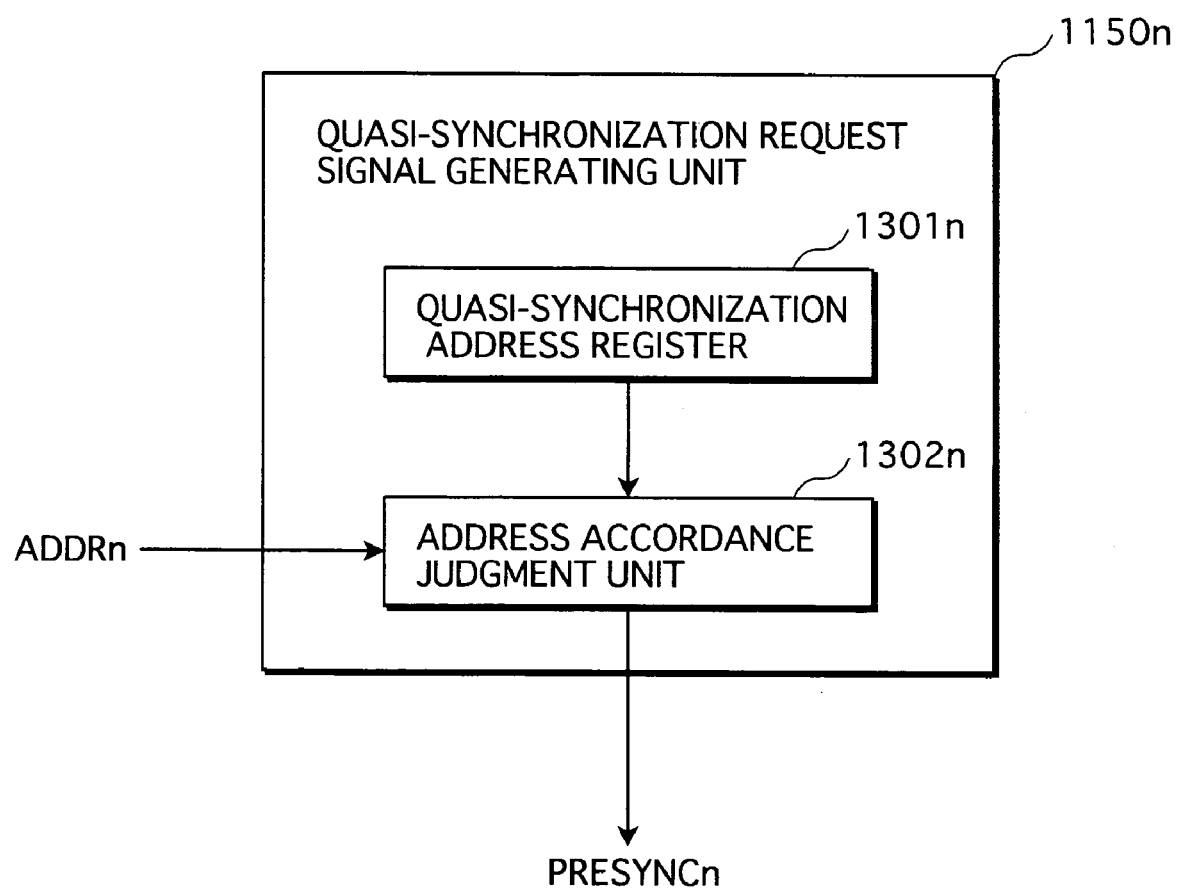
FIG. 13 is a block diagram showing a functional structure of a quasi-synchronization request signal generating unit relating to the second embodiment.

Each of the quasi-synchronization request signal generating units 1150a, 1150b, . . . 1150n outputs a quasi-synchronization request signal when the PE has reached a quasi-synchronization point which is a little before a synchronization point in their operation. Specifically, as shown in FIG. 13, each quasi-synchronization request signal generating unit includes a quasi-synchronization address register 1301 and an address accordance judgment unit 1302. FIG. 13 only shows the quasi-synchronization request signal generating unit 1150n as an example, however the other quasi-synchronization request signal generating units respectively have substantially the same structure. The quasi-synchronization address register 1301 stores the addresses of instructions of programs, which are to be executed before arrival of the synchronization point. The address accordance judgment unit 1302 monitors whether an address in the quasi-synchronization address register matches ADDRn outputted to the address bus. When the ADDRn has a matching address in the quasi-synchronization register 1301, the address accordance judgment unit 1302 issues a quasi-synchronization request signal.

Note that it is preferable that the address set in the quasi-synchronization address register 1301 be an instruction address of about 1,000 cycles in the unit of process clock, considering the case where stabilization of power supply voltage takes long.

The shared memory 1160 manages all the variables used in operations that the entire multiprocessor performs. Each variable is rewritten by a respective PE upon request according to the operation result of the PEs. In principle, writing to the shared memory 1160 is permitted by one PE at a time, so as to prevent access competition.

Note that each cache memory and the shared memory 1160 are necessary structures of a general multiprocessor system of a shared memory type, but are not necessary for the essential function of the present embodiment.

<Operation>

The following details the operations performed by the multiprocessor control apparatus 1100 relating to the second embodiment.

Figure 14:
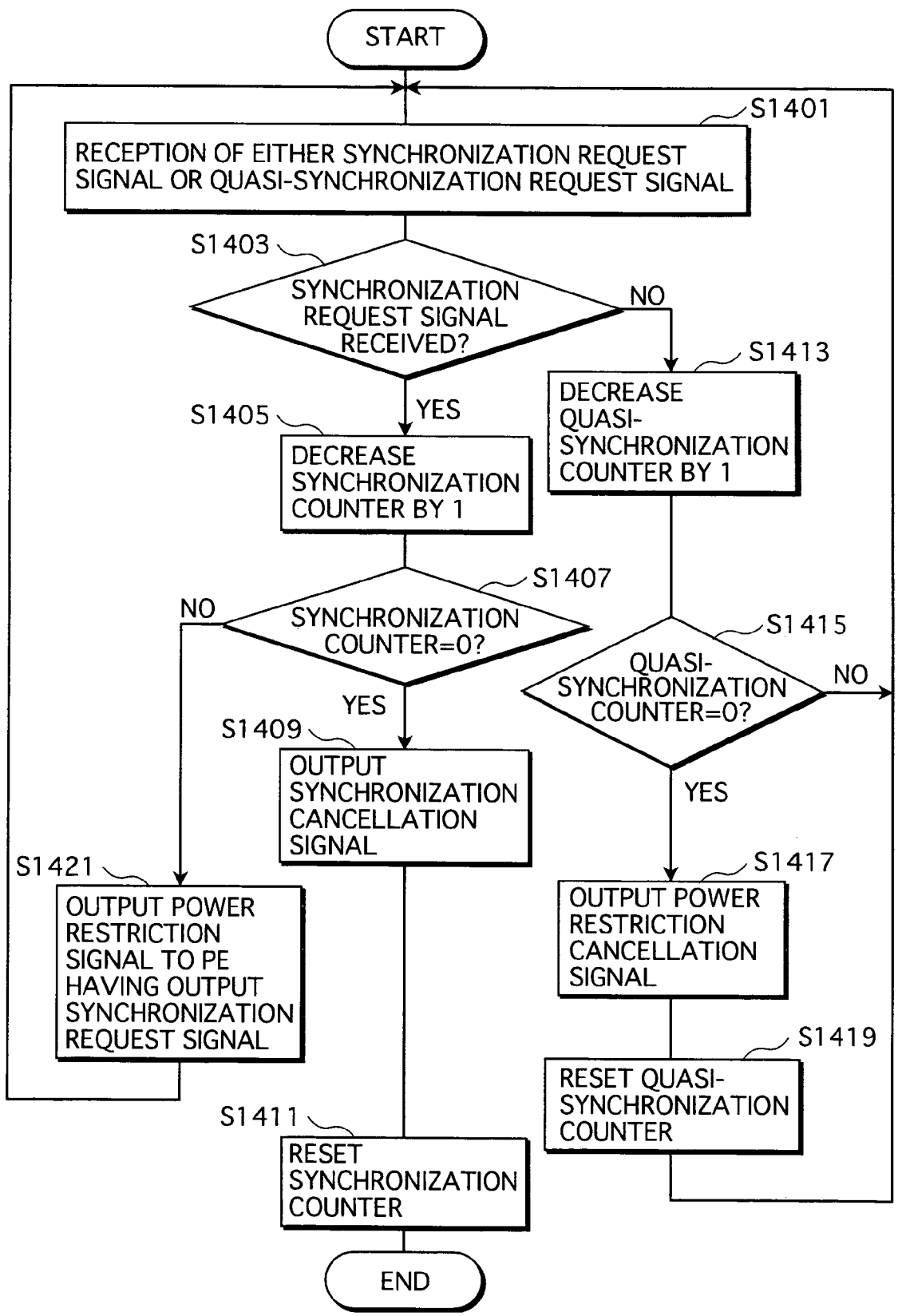
FIG. 14 is a flowchart showing an operation performed by the multiprocessor control apparatus relating to the second embodiment.

FIG. 14 is a flowchart showing the operation performed by the multiprocessor control apparatus 1100. Just as in the first embodiment, this flowchart describes the operations of the synchronization control unit 1120 as the multiprocessor control apparatus 1100.

First, the synchronization control unit 1120 receives either a synchronization request signal SYNC or a quasi-synchronization request signal PRESYNC (Step S1401). When a synchronization request signal SYNC is received (Step S1401: YES), the synchronization counter 1201 is reduced by 1 (Step S1405). Then, the synchronization establishment judgment unit 1202 judges whether the number at the synchronization counter 1201 has become 0 (Step S1407).

When the judgment results in the affirmative (Step S1407: YES), the clock supply to each of corresponding PEs is resumed via the power control unit 1130, and a synchronization-wait cancellation signal ACK is outputted to each of the corresponding PEs (Step S1409). Then the synchronization counter 1201 is reset and the processing ends (Step S1411).

When a quasi-synchronization request signal is received (Step S1403: NO), the quasi-synchronization counter 1206 is decreased by 1 (Step S1413). Then the synchronization prediction judgment unit 1204 monitors whether the quasi-synchronization counter 1206 has reached 0 (Step S1415). When it has become 0, a synchronization prediction signal ALMOST is outputted to the sequencer 1205. Then the sequencer 1205 outputs a control signal CTRL for canceling the power restriction to the PE under power restriction, to the power control unit 1130 (Step S1417). Then the quasi-synchronization counter 1206 is reset and updated to the same number of the PEs (Step S1419). The control returns to Step S1401 for subsequent processing.

When the synchronization counter 1204 does not indicate 0 in Step S1407, a control signal CTRL for power restriction with respect to a PE having outputted a synchronization request signal is outputted (Step S1421). Then the control returns to Step S1401 for subsequent processing.

Figure 15:
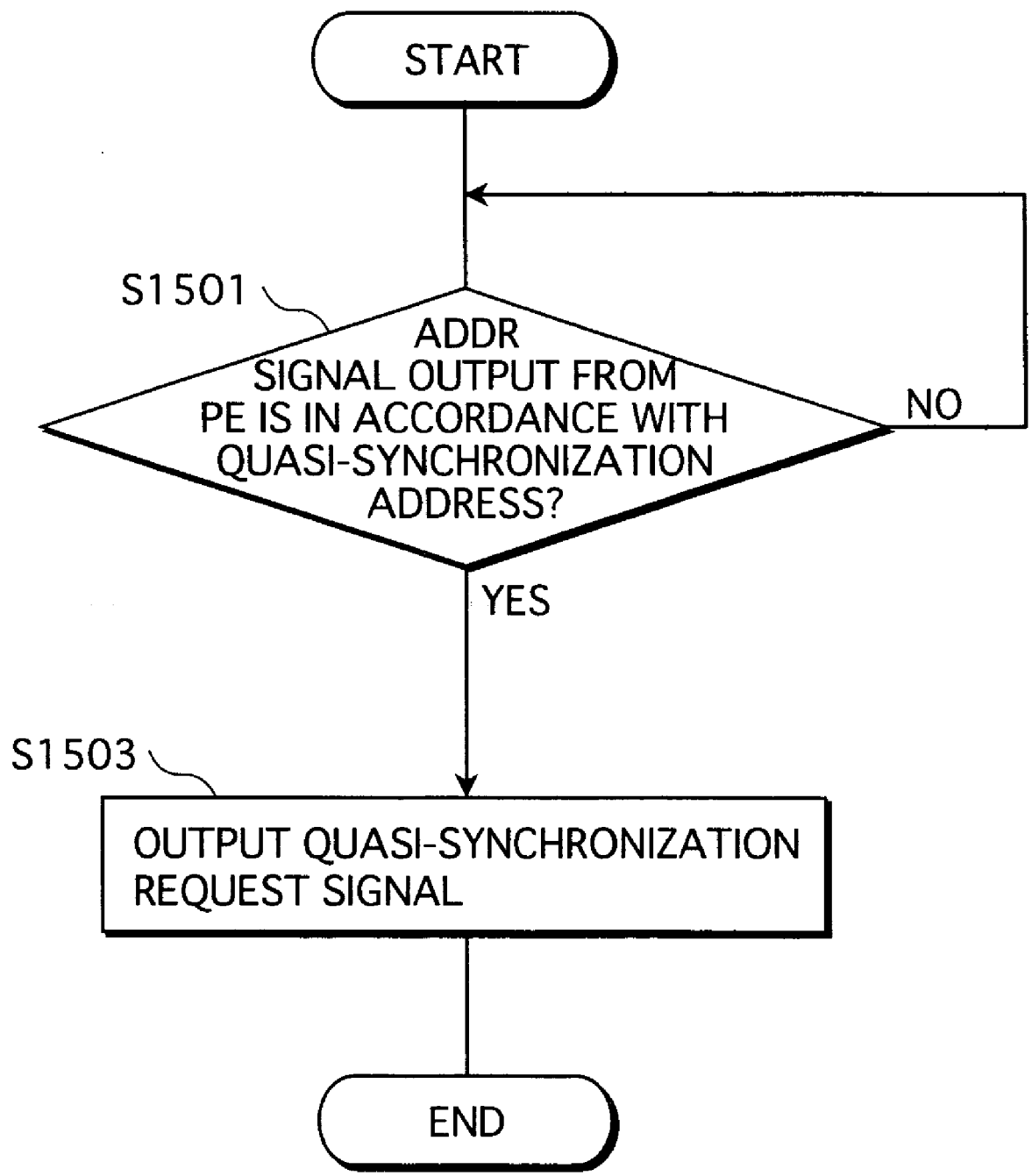
FIG. 15 is a flowchart showing an operation performed by the quasi-synchronization request signal generating unit.

The following describes the operations performed by the quasi-synchronization request signal generating unit 1150, with reference to the flowchart shown in FIG. 15.

The quasi-synchronization address judgment unit 1302 judges whether the address signal running in the address bus is in accordance with the address of the quasi-synchronization address register 1301 (Step S1501). When the judgment results in the negative (Step S1501: NO), the control returns to Step S1501 for performing a judgment every time a new address signal runs in the address bus.

When the judgment results in the affirmative (Step S1501: YES), the quasi-synchronization address accordance unit 1302 outputs a quasi-synchronization request signal PRESYNC, indicating that the operation has reached a quasi-synchronization point, to the synchronization control unit 1120. Then the control ends.

As follows, the operation of the multiprocessor control apparatus 1100 is described by way of an example.

Figure 16:
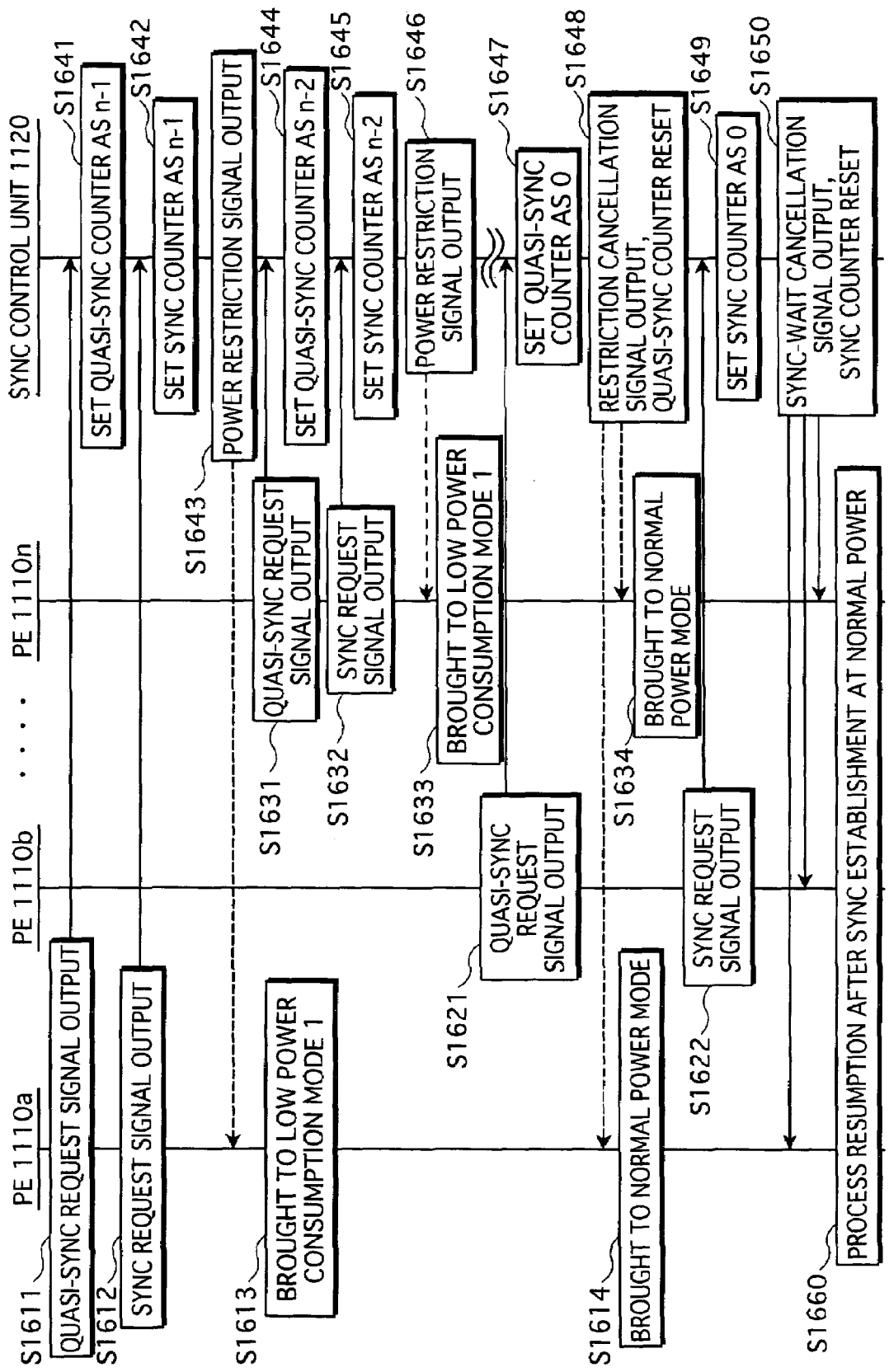
FIG. 16 is a timing chart showing one example of operational timings relating to each PE and the synchronization control unit, in the second embodiment.

FIG. 16 is a timing chart showing the operational example. In this timing chart, the PE 1110a is the PE which finishes its processing first, and the PE 1110n finishes its processing immediately following the PE 1110a. The PE 1110b finishes its processing the last of all the PEs.

When the quasi-synchronization address accordance judgment unit judges that the address signal ADDRa in the address bus matches the address stored in the quasi-synchronization address register 1301a, the quasi-synchronization request signal generating unit 1150a generates and output a quasi-synchronization request signal PRESYNCa to the synchronization control unit 1120 (Step S1611). The synchronization control unit 1120, receiving the quasi-synchronization request signal PRESYNCa, decreases the quasi-synchronization counter 1206 by 1, to set n−1 thereto (Step S1641).

Next, the PE 1110a, having reached a synchronization point, outputs a synchronization request signal SYNCa to the synchronization control unit 1120 (Step S1643). The synchronization control unit 1120, receiving the synchronization request signal SYNCa, decreases the synchronization counter 1201 by 1, to set n−1 thereto (Step S1642). Then the power restriction judgment unit 1203 outputs a power restriction signal SUPPRESS to the sequencer 1205. The sequencer 1205 outputs, to the power control unit 1130, a control signal CTRL for restricting power directed to the PE 1110a (Step S1643). The power control unit 1130, based on the control signal CTRL, starts supplying low power to the PE 1110a by stepping down the voltage, as well as stopping the clock supply with respect to the PE 1110a. Under restriction in both power and clock, the PE 1110a goes into the low power consumption mode 1 (Step S1613).

When the PE 1110n reaches a quasi-synchronization point, following the PE 1110a, the PE 1110n outputs a quasi-synchronization request signal PRESYNCn to the synchronization control unit 1120 (Step S1631). The synchronization control unit 1120, receiving the quasi-synchronization request signal PRESYNCn, decreases the quasi-synchronization counter 1206 by 1, to set n−2 thereto (Step S1644).

The PE 1110n, when reaching a synchronization point, outputs synchronization request signal SYNCn to the synchronization control unit 1120 (Step S1632). The synchronization control unit 1120, receiving the synchronization request signal SYNCn, decreases the synchronization counter 1201 by 1, to set n−2 thereto (Step S1645). Then, the power restriction judgment unit 1203 outputs to the sequencer 1205 a power restriction signal SUPPRESS for restricting power directed to the PE 1110n. The sequencer 1205 then outputs to the power control unit 1130 a control signal CTRL for restricting power directed to the PE 110n (Step S1646). The power control unit 1130, receiving the control signal CTRL, starts supplying low power to the PE 1110n, as well as stopping clock supply with respect to the PE 1110n. As a result, the PE 1110n goes into the low power consumption mode 1.

After this, every time a PE (other than PE 1110b) reaches a quasi-synchronization point, the number at the quasi-synchronization counter 1206 is decreased by 1. In addition, every time a PE (other than the PE 1110b) reaches a synchronization point, the number at the synchronization counter 1201 is decreased by 1, thereby performing power restriction directed to the PE having outputted a synchronization request signal.

Finally, the PE 1110b reaches a quasi-synchronization point, and the quasi-synchronization signal generating unit 1150b outputs a quasi-synchronization request signal PRESYNCb to the synchronization control unit 1120 (Step S1621). Receiving the quasi-synchronization request signal PRESYNCb, the synchronization control unit 1120 decreases the quasi-synchronization counter 1206 by 1, to set 0 thereto (Step S1647). Confirming that the number shown by the quasi-synchronization counter 1206 has become 0, the synchronization prediction judgment unit 1204 outputs a synchronization prediction signal ALMOST to the sequencer 1205. The sequencer 1205, receiving from the power control unit 1130 a state signal STATUS which indicates information of PE under power restriction, outputs a control signal CTRL for canceling power restriction of the PE(s) under power restriction. In addition, the quasi-synchronization counter 1206 is reset and updated to n, being the number of all the PEs (Step S1648). The PE(s) whose power restriction is cancelled start gaining normal power (Steps S1614, S1634).

When the PE 1110b reaches a synchronization point, a synchronization request signal SYNCb is outputted to the synchronization control unit 1120 (Step S1622). The synchronization control unit 1120, receiving this last synchronization request signal SYNCb, decreases the synchronization counter 1201 by 1, to set 0 thereto (Step S1649). When the synchronization counter 1201 has become 0, the synchronization establishment judgment unit 1202 issues a synchronization establishment signal ESTABLISH. The sequencer 1205 outputs to the power control unit 1130 a control signal CTRL for resuming the clock supply, as well as outputting a synchronization-wait cancellation signal ACK to each PE. In addition, the synchronization counter 1205 is reset to be updated to n (Step S1650).

Each PE, receiving a synchronization cancellation signal ACK, performs subsequent processing after the respective synchronization point (Step S1660).

Modification Example of the Second Embodiment

The present modification example of the second embodiment is about a case where the power supply is completely stopped, just as in the modification example of the first embodiment.

The main structure and operation is basically the same as the case of the second embodiment. Therefore, the following focuses on the differences with the second embodiment.

<Structure>

Figure 17:
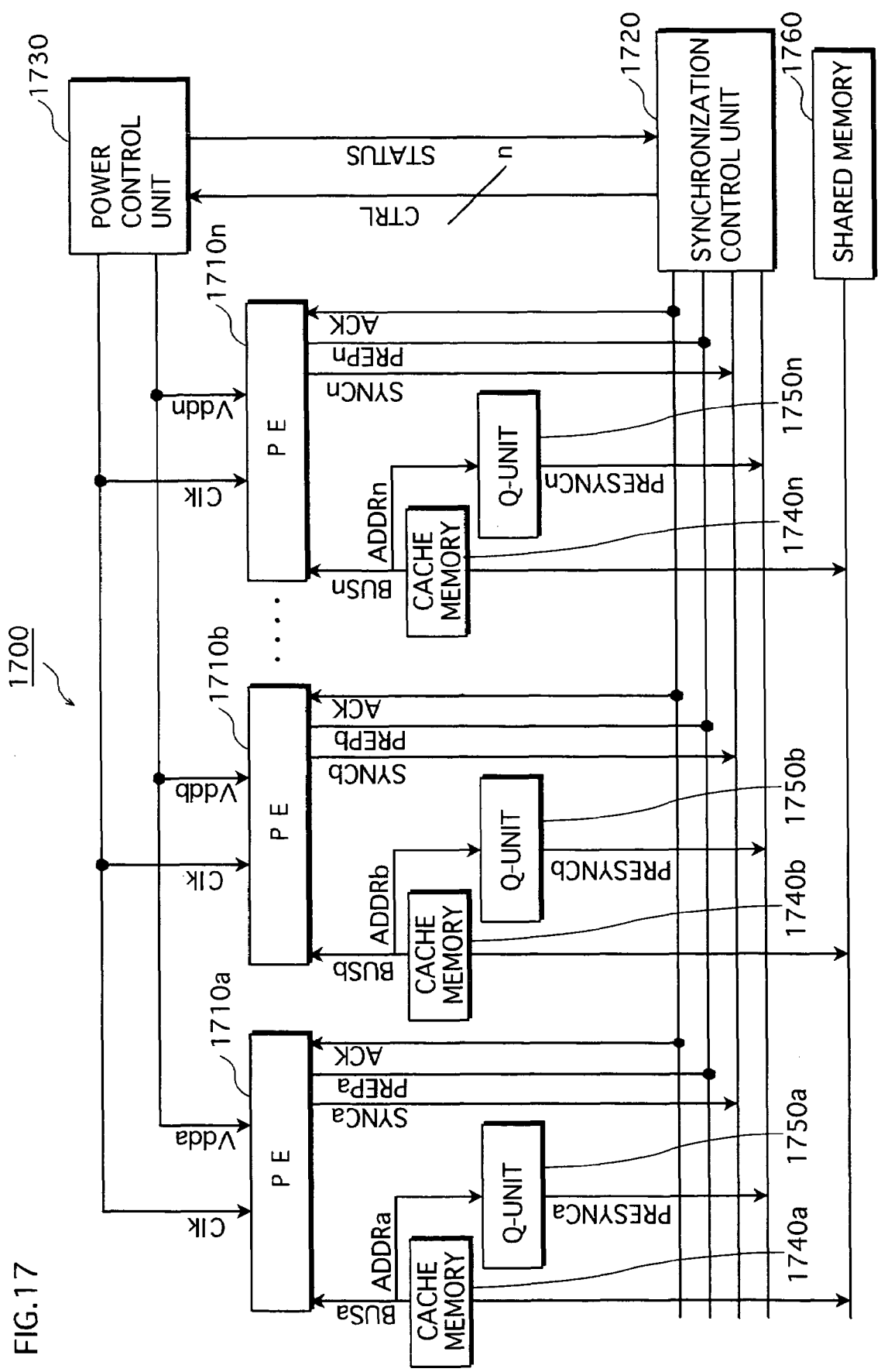
FIG. 17 is a block diagram showing a functional structure of a multiprocessor control apparatus relating to a modification example of the second embodiment.
Figure 18:
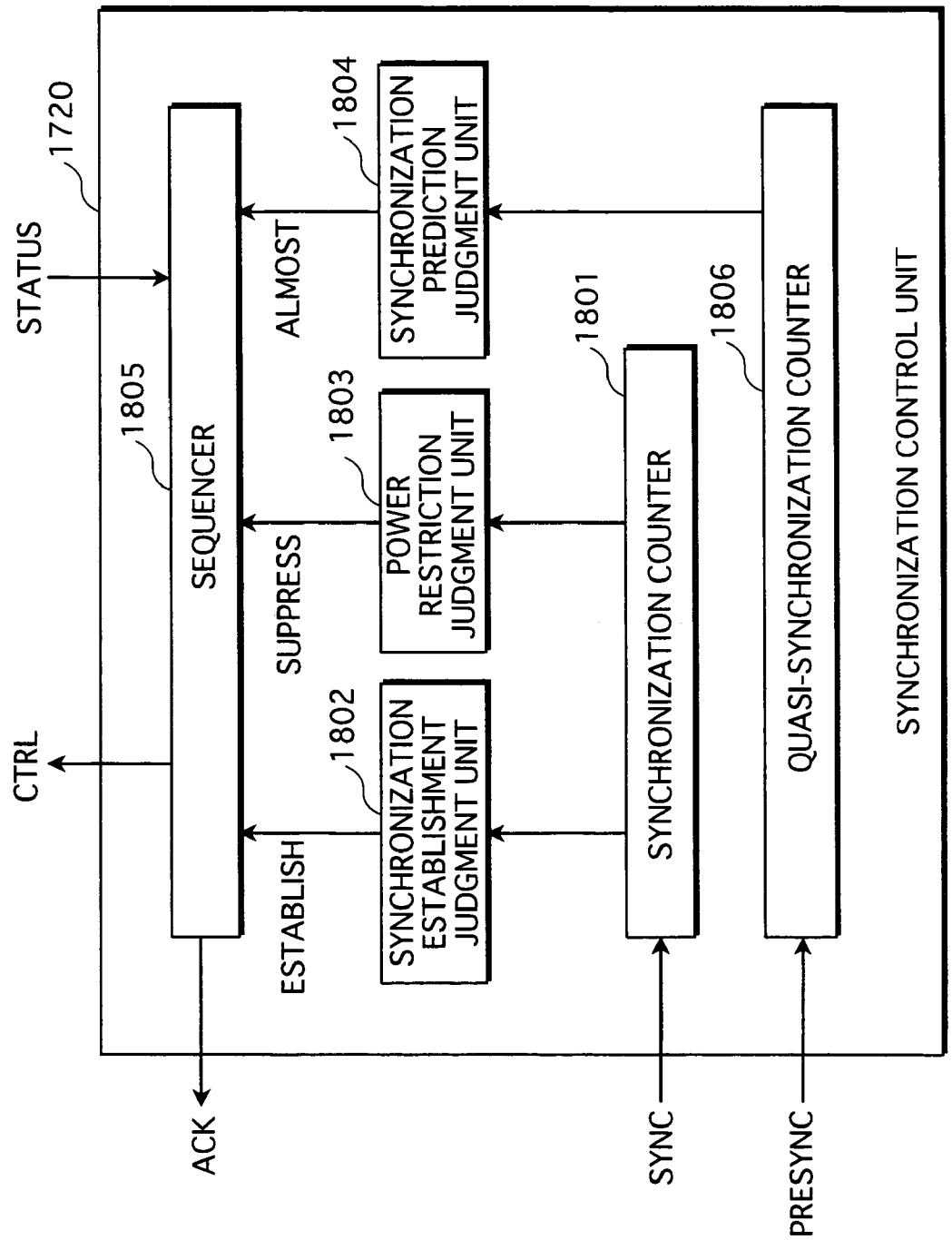
FIG. 18 is a block diagram showing a functional structure of a synchronization control unit relating to the modification example of the second embodiment.

FIG. 17 shows a functional structure of a multiprocessor control apparatus 1700 relating to the modification example of the second embodiment.

In the multiprocessor control apparatus 1700 relating to the present modification example has substantially the same structure as the counterpart in the second embodiment. The difference with the second embodiment is that the multiprocessor control apparatus 1700 is equipped with a bus line via which a synchronization preparation signal PREP is outputted from the synchronization control unit 1730 to each PE. Here, the synchronization preparation signal PREP is for prompting any PEs under power-off state to perform context restoration.

In addition, the sequencer 1805 of the synchronization control unit 1720 has a function of outputting this synchronization preparation signal PREP. This synchronization preparation signal PREP is outputted after each PE is again provided with power and the power supply voltage has stabilized based on the state signal STATUS outputted from the power control unit 1730.

The quasi-synchronization request signal generation units 1750a, 1750b, . . . , 1750n (abbreviated as "Q-unit" in the drawing) respectively have a quasi-synchronization address register. The address of each quasi-synchronization address register is set by taking into account the time required for context restoration in addition to the time required for the power supply stabilization. Note that the context restoration takes, at the latest, about 100 cycles in the unit of process clock. Therefore, the total time required for both of the power stabilization and context restoration is approximated as 1,100 cycles. In view of this, it is desirable to set the address at the instruction address 1,100 cycles in advance.

<Operation>

Figure 19:
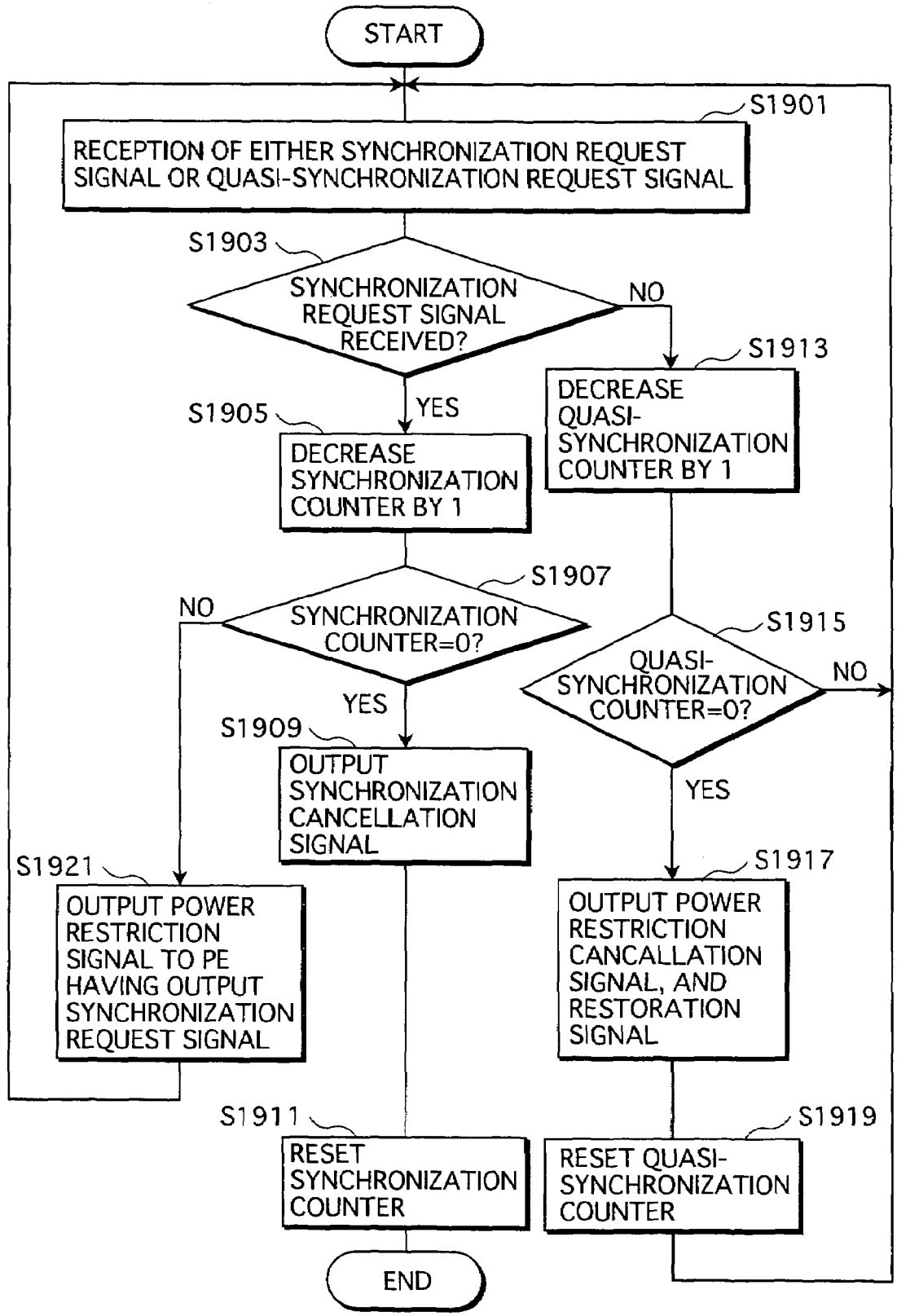
FIG. 19 is a flowchart showing an operation performed by the multiprocessor control apparatus relating to the modification example of the second embodiment.

The following details the operations performed by the multiprocessor control apparatus 1700 relating to the modification example of the second embodiment is described using the flowchart of FIG. 19.

In Step S1917 of FIG. 19, the synchronization control unit 1720 outputs a synchronization preparation signal PREP to each PE under power cut-off for prompting context restoration, unlike Step S1417 of FIG. 14 of the second embodiment.

The other operations are the same as those in the second embodiment.

Figure 20:
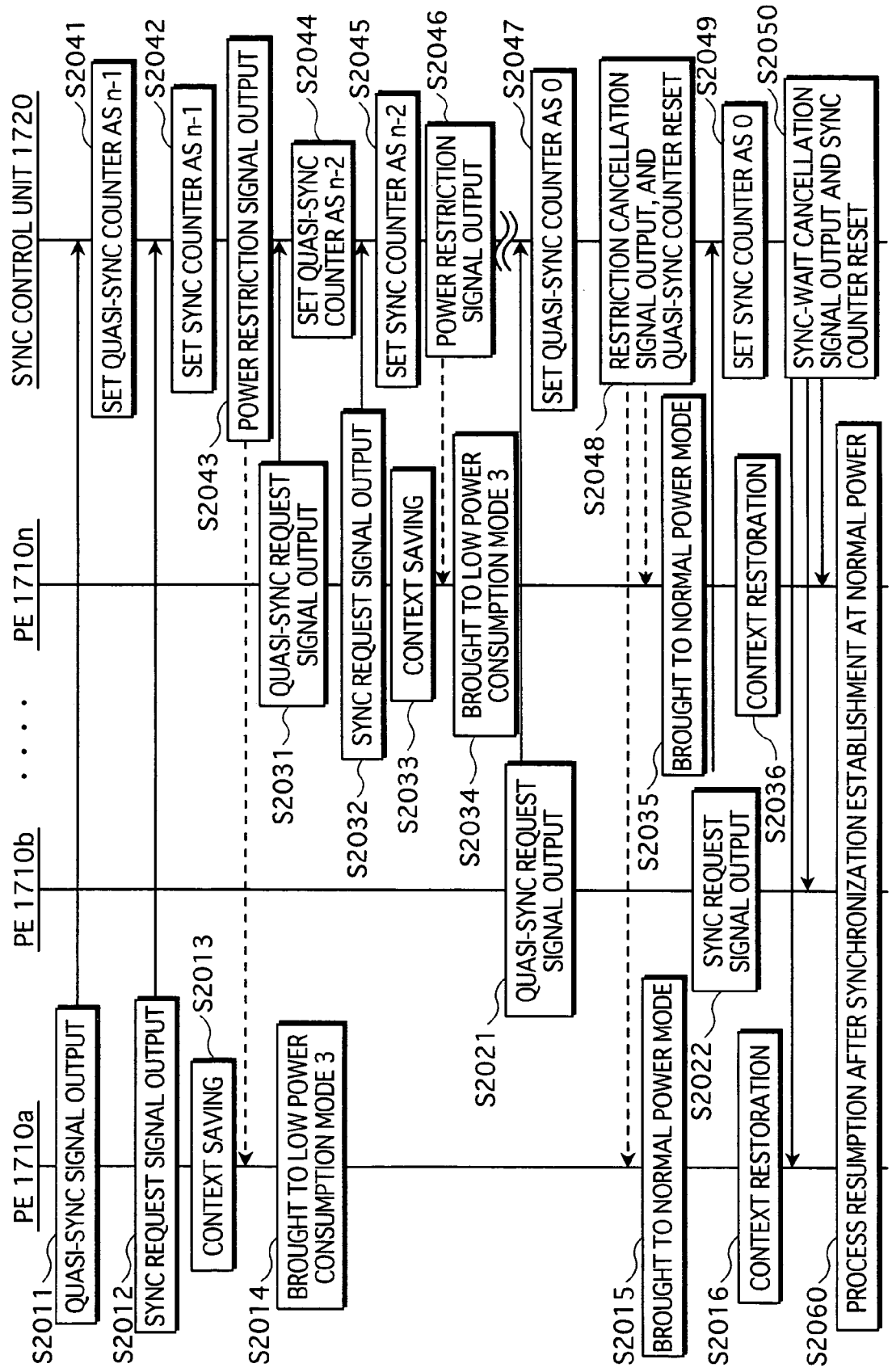
FIG. 20 is a timing chart showing an operational example of the multiprocessor control apparatus relating to the modification example of the second embodiment.

FIG. 20 is a timing chart illustrated by modifying FIG. 16 relating to the second embodiment, to agree with the present modification example.

The following two points are different, as can be understood from comparing the timing chart of FIG. 16 and the timing chart of FIG. 20. The first difference is that the PE 1710a and the PE 1710n perform context saving in the modification example of the second embodiment (Steps S2013, S2033). The second difference is that each PE, which has started to gain power supply (Step S2015), performs context restoration, after the power supply voltage thereto is stabilized, and based on a synchronization preparation signal PREP received from the synchronization control unit 1720 (Step S2016).

<Other Notes>

So far, the multiprocessor control apparatus relating to the present invention has been described based on the embodiments. However, needless to say, the present invention should not be limited to such concrete examples described above, and can include other modification examples. The following describes some of these modification examples.

(1) In the above-described embodiments, the synchronization control unit is equipped with a synchronization counter and a quasi-synchronization counter. However these counters are not essential.

Figure 22:
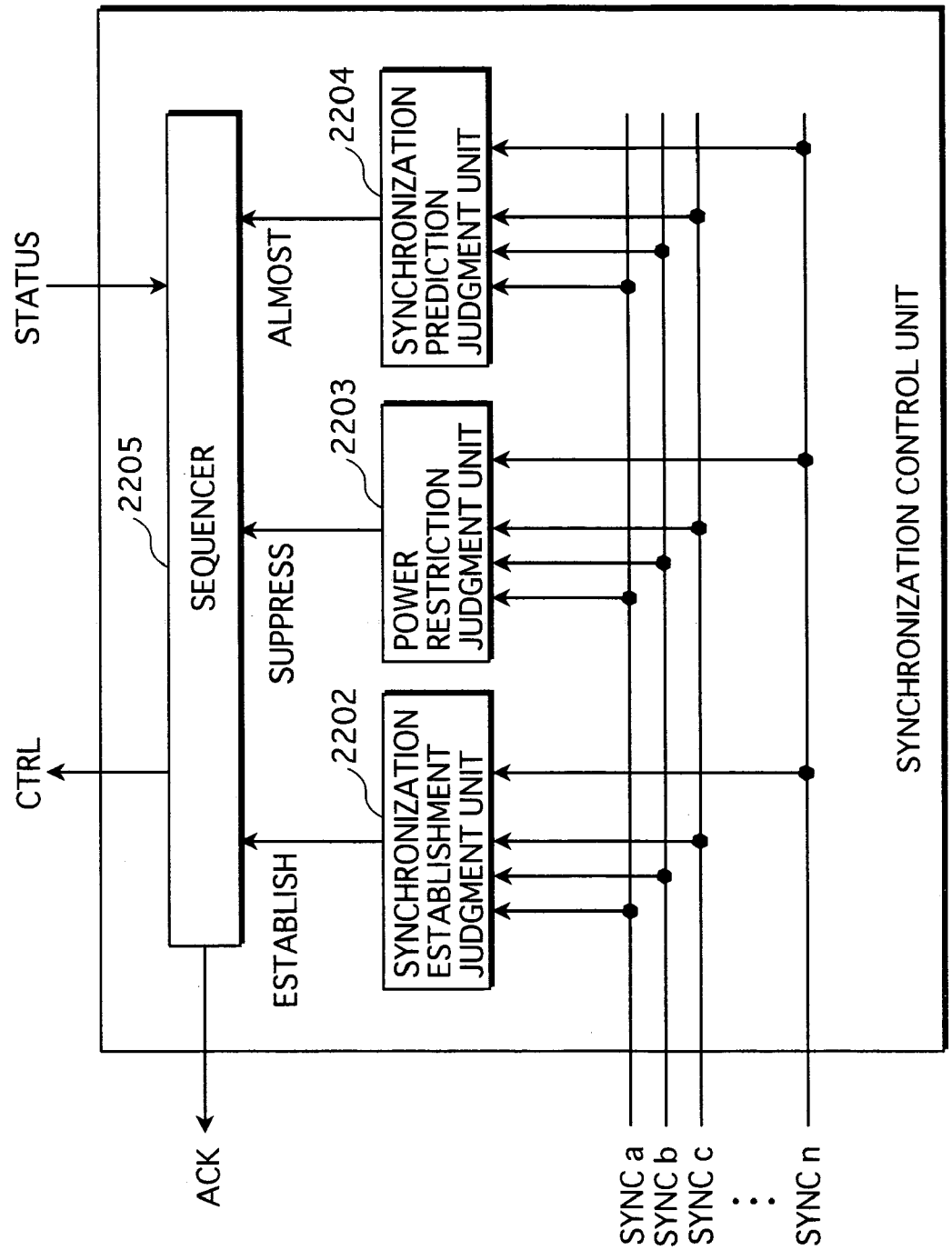
FIG. 22 is a block diagram showing a modification example relating to the functional structure of the synchronization control unit.

For example, the synchronization control unit may have a structure shown in FIG. 22. In this drawing, each bus line for a corresponding PE is provided to convey a synchronization request signal SYNC. Likewise, so as to convey a quasi-synchronization request signal PRESYNC, too, each bus line for a corresponding PE may be provided (Not shown in the drawing).

Figure 23A:
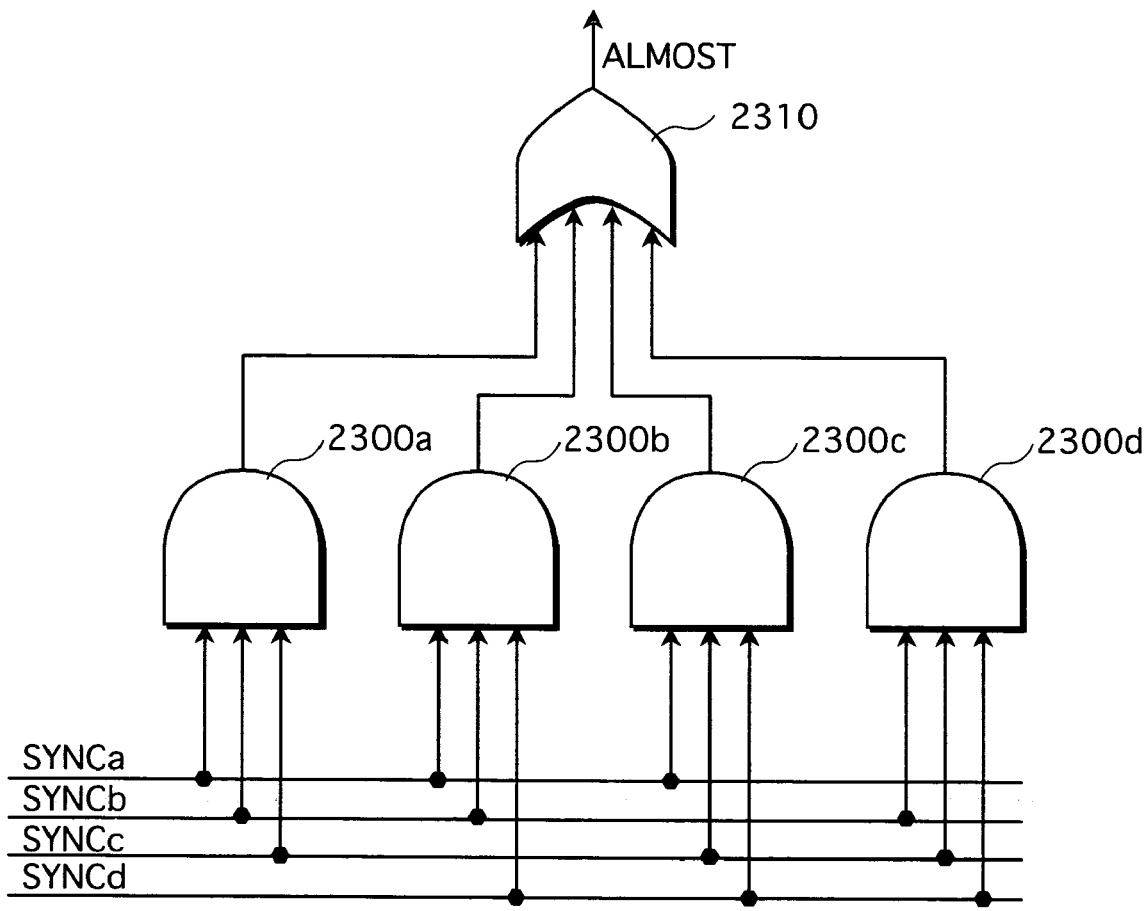

In such cases, the structure of the synchronization prediction judgment unit may be a circuit structure as shown in FIG. 23A. This drawing describes a case where there are four PEs; namely PEa, PEb, PEc, and PEd, for the sake of simplification.

As shown in FIG. 23A, the synchronization prediction judgment unit can be structured by AND and OR circuits. Each AND circuit is designed to receive a synchronization signal from all the PEs except one PE. For example, the AND circuit 2300a is designed to receive: a synchronization request signal SYNCa from the PEa, a synchronization request signal SYNCb from the PEb; and a synchronization request signal SYNCc from the PEc. When any of the AND circuits receives three signals, a signal indicating "1" is outputted to the OR circuit. Accordingly, a synchronization prediction signal ALMOST indicating that the synchronization will be established soon will be ready for output.

Figure 23B:
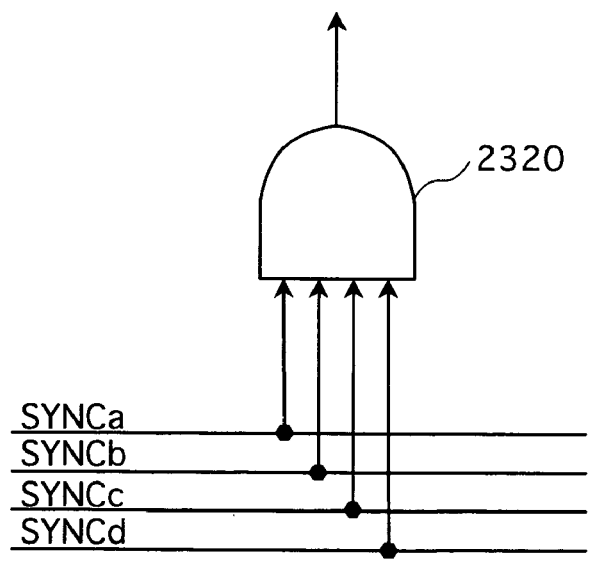

FIG. 23B illustrates one example of the structure of the synchronization establishment judgment unit in such a case.

A power restriction judgment unit can be realized by replacing the OR circuit of FIG. 23A with an NOR circuit.

(2) In the first embodiment and its modification example, the synchronization prediction judgment unit outputs a synchronization prediction signal ALMOST when the number at the synchronization counter has become 1. However, ALMOST can be outputted when the synchronization counter indicates 2 or 3. By such an arrangement, more time will be allowed for stabilization of power supply voltage. In addition, the structure is able to support a case where the last two PEs finish their operations at the same time.

Figure 21:
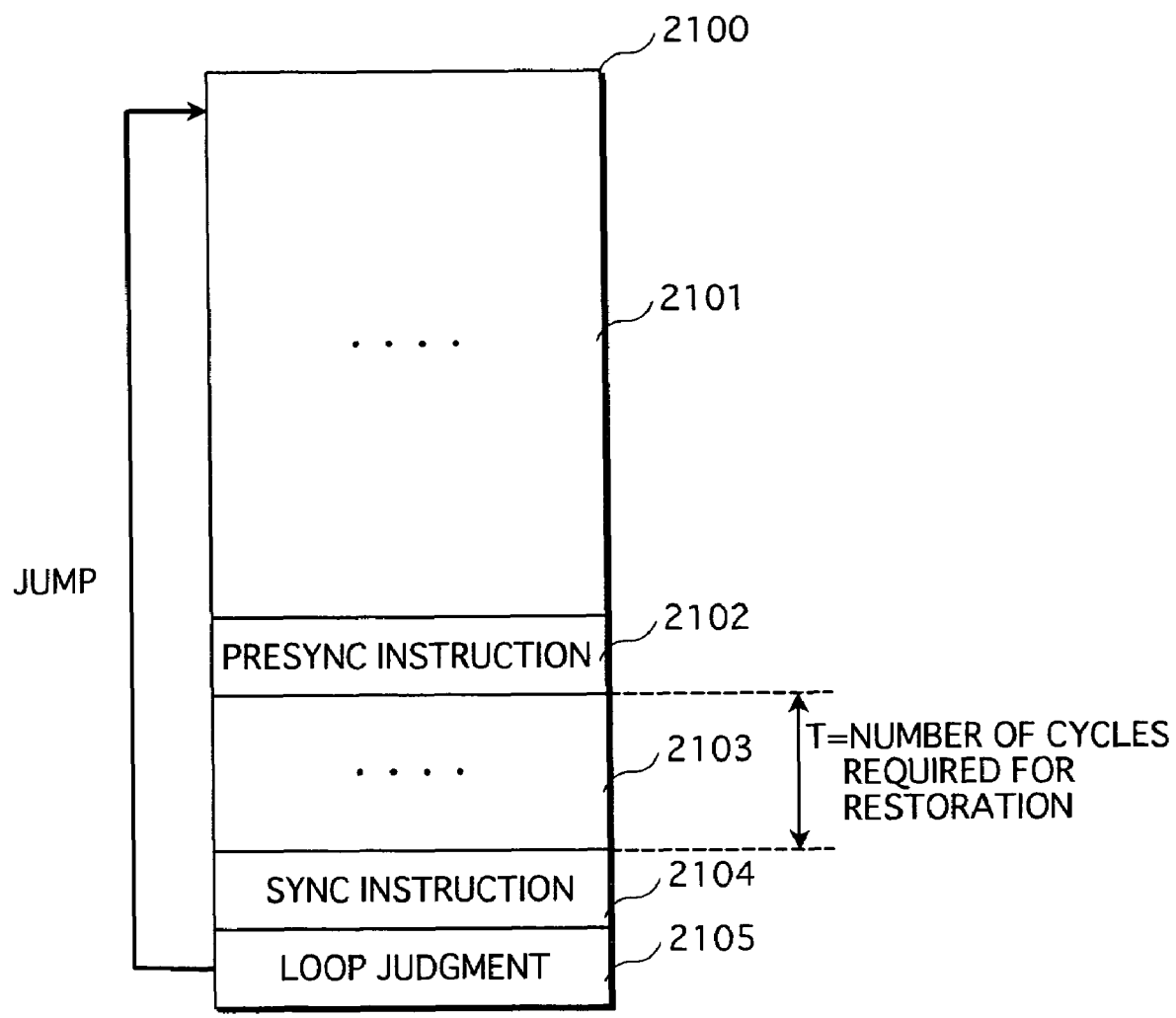
FIG. 21 is a diagram showing an example of a program executed by a multiprocessor control apparatus relating to the second embodiment.

(3) In the above description, the second embodiment is provided with the quasi-synchronization request signal generating unit for output of a quasi-synchronization request signal. However, it is possible to provide each PE with a port for output of a quasi-synchronization request signal. In this case, it is possible to insert an instruction for generating a quasi-synchronization request signal into a program executed in each PE, thereby determining a timing of outputting the quasi-synchronization request signal. FIG. 21 shows a program example 2100 used in such a case. In such a multiprocessor system as applicable to the present example, it is quite probable to be able to estimate the number of execution cycles from the PRESYNC instruction to the SYNC instruction (i.e. about 1,000 cycles). Therefore, if necessary, a quasi-synchronization request signal may be outputted by insertion of a PRESYNC instruction taking into consideration the number of cycles (about 100 cycles) required for context restoration.

In inserting such a PRESYNC instruction when describing a program, care should be taken if 1,000 or 1,100 cycles in advance of the SYNC instruction corresponds to a loop operation or a branch operation.

(4) In the second embodiment and its modification example, described above, the output timing of a quasi-synchronization request signals is either 1,000 or 1,100 cycles in advance of outputting of a corresponding synchronization request signal. However, the present invention is not limited to such a structure. There can be cases where the operations end within 1,000 cycles. In such cases, it is possible to output before the mentioned cycles pass.

(5) In the above description, the first embodiment and its modification example have the structure shown in FIG. 1. However, they may be structured as in FIG. 24.

Figure 24:
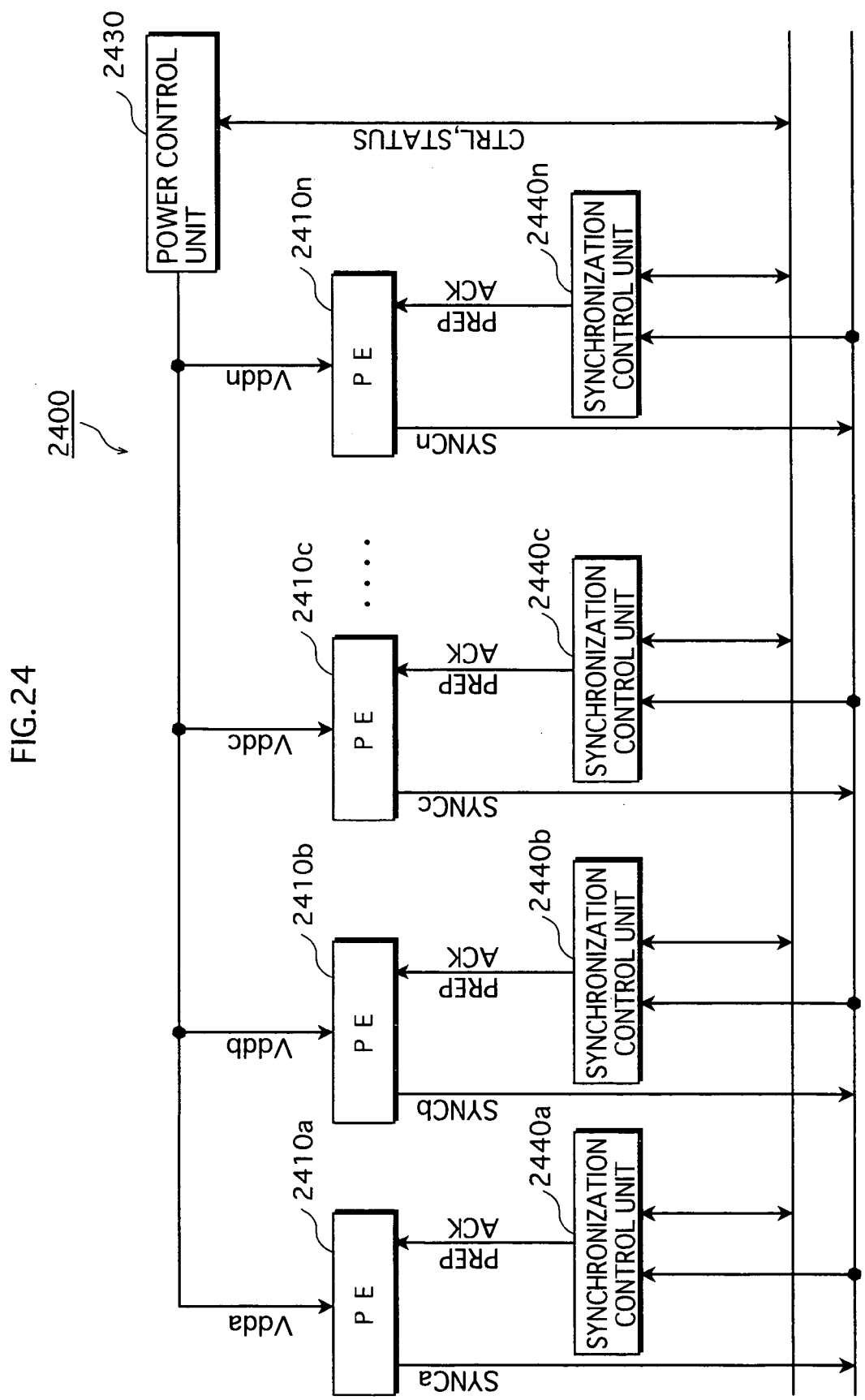
FIG. 24 is a block diagram showing a modification example of the functional structure of the first embodiment.

In FIG. 24, each PE is provided with a synchronization control unit. In this case, each of the synchronization control units 2440a, 2440b, 2440c, . . . , 2440n is able to know the output state of the synchronization request signal of the other PEs than the PE connected to the corresponding synchronization control unit, via the bus lines. In this way, the synchronization control unit 2440 may be placed under distribution control. It is also expected to produce the same effect as in the first embodiment and its modification example, according to such a structure.

(6) Each unit constituting a multiprocessor control apparatus maybe realized as part or all of an LSI (large scale integration) or a VLSI (very large scale integration). Alternatively, each unit may be realized as a plurality of LSIs, or as a combination of one or more LSI and other circuits.

(7) In the above-described examples, the low power consumption mode 1 is described to lower the power supply voltage "to the extent that the information (e.g. operation result) in the register will not be lost". However, it is possible to set a threshold voltage to be a higher value for the purpose of reducing the power consumption due to a leak current of semiconductor. The threshold voltage mentioned here is a value of voltage above which the electric current will start flowing in the circuit. If a low value is set as this threshold voltage, it is more likely to generate a leak current. The ratio of a leak current to the consumption power becomes large as a semiconductor process becomes more minute. However if the threshold voltage is set to be high, leak prevention can be expected to some extent.

(8) In the above-described embodiments, the synchronization counter and the quasi-synchronization counter count the number of synchronization request signals and the number of quasi-synchronization request signals respectively, by subtraction from the default value. However, it is alternatively possible to perform addition for counting these numbers. Such a case is described taking the first embodiment as an example. As a default, "0" is set to the synchronization counter 201. Then every time a synchronization request signal is received, the synchronization counter 201 is added by 1. In addition, the synchronization prediction judgment unit 204 has a structure of outputting a synchronization prediction signal ALMOST when the number at the synchronization counter 201 comes to indicate n−1. The synchronization establishment judgment unit 202 has a structure of outputting a synchronization establishment signal ESTABLISH when the number at the synchronization counter 201 has become n.

(9) Although it is not specifically mentioned in the above description, it is preferable to design the synchronization counter to receive one synchronization request signal at a time. Likewise, it is also preferable to design the quasi-synchronization counter to receive one quasi-synchronization request signal at a time.

Although the present invention has been fully described by way of examples with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A multiprocessor control apparatus comprising:
    an execution control unit operable to control a processor to, when processors other than the processor have ended respective operations performed in parallel, start performing an operation that uses a result of the operations; and
    a power control unit operable to control power supply to the processor, wherein
    when the processor has been under power-supply restriction, the power control unit cancels the power-supply restriction before one of the other processors, which is the last of all the other processors to end a corresponding operation, ends the corresponding operation.

2. The multiprocessor control apparatus of claim 1, further comprising the processor and the other processors, wherein
    each of the other processors includes a synchronization request signal outputting unit operable to output a synchronization request signal that indicates ending of a corresponding operation,
    the execution control unit includes a cancellation-signal outputting unit operable to output a cancellation signal for canceling the power-supply restriction when a number of outputted synchronization request signals has reached a predetermined number that is smaller than a number of the other processors, and
    the power control unit cancels the power-supply restriction upon reception of the cancellation signal.

3. The multiprocessor control apparatus of claim 2, wherein
    the cancellation-signal outputting unit a) includes: a counter for counting a number of synchronization request signals outputted after the other processors have started the respective operations, and b) outputs the cancellation signal when a number counted by the counter has become one short of the number of the other processors.

4. The multiprocessor control apparatus of claim 2, wherein
    the execution control unit includes a processor information outputting unit, where
    when any of the other processors, except for the last or one before the last processor of all the other processors to end an operation, outputs a synchronization request signal, the processor information outputting unit outputs processor information on the any of the other processors that has outputted the synchronization request signal, and
    the power control unit, upon reception of the processor information, restricts the power supply to the any of the other processors that is indicated by the processor information, and cancels the power-supply restriction to the any of the other processors at the time of canceling the power-supply control to the processor.

5. The multiprocessor control apparatus of claim 4, wherein
    the power control unit a) includes: a low-power supply unit operable to supply power lower than normal power to the processor and the other processors; and a normal-power supply unit operable to supply normal power, and b) restricts power supply to the processor by means of the low-power supply unit, and c) cancels the power-supply restriction by means of the normal-power supply unit.

6. The multiprocessor control apparatus of claim 4, wherein
    the power control unit stops supplying power to the processor, and
    each of the other processors includes:
        a saving unit operable to save information about a register included in a corresponding processor, to a memory after the corresponding processor has outputted a synchronization request signal and before the corresponding processor is brought to the power-supply stop; and
        a restoring unit operable to read the saved information from the memory for restoration.

7. The multiprocessor control apparatus of claim 1, further comprising the processor and the other processors, wherein
    each of the other processors includes a quasi-synchronization request signal outputting unit operable to output a quasi-synchronization request signal indicating that a corresponding processor has reached a point where there is a predetermined number of instructions left before ending of the corresponding operation,
    the execution control unit includes a cancellation-signal outputting unit operable to output a cancellation signal for canceling the power-supply restriction when all the other processors have outputted quasi-synchronization request signals respectively, and
    the power control unit cancels the power-supply restriction upon reception of the cancellation signal.

8. The multiprocessor control apparatus of claim 7, wherein
    each of the other processors further includes a synchronization request signal outputting unit operable to output a synchronization request signal that indicates ending of a corresponding operation,
    the execution control unit includes a processor information outputting unit, where when any of the other processors, except for the last of all the other processors to end an operation, outputs a synchronization request signal, the processor information outputting unit outputs processor information on the any of the other processors that has outputted the synchronization request signal, and the power control unit, upon reception of the processor information, restricts the power supply to the any of the other processors that is indicated by the processor information, and cancels the power-supply restriction to the any of the other processors at the time of canceling the power-supply control to the processor.

9. The multiprocessor control apparatus of claim 7, wherein each of the other processors a) includes: an address information outputting unit operable to output address information about an address of an instruction currently executed by a corresponding processor; and an address storage unit operable to store a predefined address, and b) outputs the quasi-synchronization request signal when the address information outputted by the address information outputting unit accords with the address stored in the address storage unit.

10. The multiprocessor control apparatus of claim 7, wherein the quasi-synchronization request signal is outputted at the time when a special instruction for outputting a quasi-synchronization request signal is interpreted, the special instruction being described in a program that each of the other processors executes.

11. The multiprocessor control apparatus of claim 8, wherein the power control unit a) includes: a low-power supply unit operable to supply power lower than normal power to the processor and the other processors; and a normal-power supply unit operable to supply normal power, and b) restricts power supply to the processor by means of the low-power supply unit, and c) cancels the power-supply restriction by means of the normal-power supply unit.

12. The multiprocessor control apparatus of claim 8, wherein the power control unit stops supplying power to the processor, and each of the other processors includes:

a saving unit operable to save information about a register included in a corresponding processor, to a memory after the corresponding processor has outputted a synchronization request signal and before the corresponding processor is brought to the power-supply stop; and a restoring unit operable to read the saved information from the memory for restoration.

13. The multiprocessor control apparatus of claim 1, further comprising the processor and the other processors, wherein the processor, using the result of the respective operations performed in parallel by the other processors and a result of a first operation executed in the processor, performs a second operation, the processor includes a first synchronization request signal outputting unit operable to output a synchronization request signal that indicates ending of the first operation when the first operation ends, each of the other processors includes a second synchronization request signal outputting unit operable to output a synchronization request signal that indicates ending of the respective operations when a corresponding one of the respective operations ends, and the power control unit restricts power supply to a processor having outputted a synchronization request signal when not all processors, including the processor and the other processors, have ended respective operations yet.

14. The multiprocessor control apparatus of claim 13, wherein the power control unit a) includes a clock supply unit operable to supply clocks to each of the processor and the other processors, and b) restricts clock supply to a processor having outputted a synchronization request signal when not all processors, including the processor and the other processors, have ended respective operations yet.

15. A multiprocessor control method used in a multiprocessor control apparatus for controlling a processor to, when processors other than the processor have ended respective operations performed in parallel, start performing an operation that uses a result of the operations, the multiprocessor control method comprising:

a power restriction step of restricting power supply to the processor;

a cancellation step of canceling the power-supply restriction before one of the other processors, which is the last of all the other processors to end a corresponding operation, ends the corresponding operation; and an execution control step of controlling the processor to, when the other processors have ended the respective operations performed in parallel, start performing the operation that uses the result of the operations.

16. An integrated circuit for controlling a multiprocessor, the integrated circuit comprising:

an execution control unit operable to control a processor to, when processors other than the processor have ended respective operations performed in parallel, start performing an operation that uses a result of the operations; and a power control unit operable to control power supply to the processor, wherein when the processor has been under power-supply restriction, the power control unit cancels the power-supply restriction before one of the other processors, which is the last of all the other processors to end a corresponding operation, ends the corresponding operation.

* * * * *

UNITED STATES PATENT AND TRADEMARK OFFICE
CERTIFICATE OF CORRECTION

PATENT NO. : 7,398,403 B2 Page 1 of 1
APPLICATION NO. : 11/169026
DATED : July 8, 2008
INVENTOR(S) : Nishioka It is certified that error appears in the above-identified patent and that said Letters Patent is hereby corrected as shown below:

In the Claims:
In Claim 4, Column 20, line 14, "on the any'" should be --on any--
In Claim 4, Column 20, line 18, "to the any" should be --to any--
In Claim 4, Column 20, line 20, "to the any" should be --to any--
In Claim 8, Column 21, line 4, "on the any" should be --on any--
In Claim 8, Column 21, line 8, "to the any" should be --to any--
In Claim 8, Column 21, line 10, "to the any" should be --to any--

Signed and Sealed this

Fourth Day of November, 2008

JON W. DUDAS
*Director of the United States Patent and Trademark Office*